United States Patent [19]

Buckley

[11] Patent Number: 4,479,241
[45] Date of Patent: Oct. 23, 1984

[54] SELF-ORGANIZING CIRCUITS FOR AUTOMATIC PATTERN RECOGNITION AND THE LIKE AND SYSTEMS EMBODYING THE SAME

[76] Inventor: Bruce S. Buckley, 7067 Via Blanca, San Jose, Calif. 95139

[21] Appl. No.: 290,784

[22] Filed: Aug. 6, 1981

[51] Int. Cl.³ .............................................. G06K 9/66
[52] U.S. Cl. ...................................... 382/15; 364/513
[58] Field of Search ............... 382/14, 15, 33, 35–37, 382/49; 364/105, 513, 421, 148; 367/135

[56] References Cited

U.S. PATENT DOCUMENTS

| | | | |
|---|---|---|---|
| 3,103,648 | 9/1963 | Hartmanis | 382/15 |
| 3,165,644 | 1/1965 | Clapper | 364/513 |
| 3,192,505 | 6/1965 | Rosenblatt | 382/14 |
| 3,275,986 | 9/1966 | Dunn et al. | 382/14 |
| 3,341,821 | 9/1967 | Kessler | 382/14 |
| 3,411,138 | 11/1968 | Andreae et al. | 382/14 |
| 3,414,885 | 12/1968 | Muller | 382/14 |
| 3,446,950 | 5/1969 | King, Jr. et al. | 382/14 |
| 3,457,552 | 7/1969 | Asendorf | 382/14 |
| 3,548,202 | 12/1970 | Ide et al. | 382/15 |
| 3,562,502 | 2/1971 | Kautz | 364/513 |
| 3,601,811 | 8/1971 | Yoshino | 382/15 |
| 3,646,329 | 2/1972 | Yoshino et al. | 382/14 |
| 3,950,733 | 4/1976 | Cooper et al. | 364/513 |

OTHER PUBLICATIONS

Widrow et al., "Practical Applications for Adaptive Data Processing Systems," *IEEE Wescon Convention Record*, vol. 7, 1963, pp. 1–14.

Primary Examiner—Leo H. Boudreau
Attorney, Agent, or Firm—Robert Shaw

[57] ABSTRACT

Self-organizing circuits to receive input signals from transducers and the like and operable, under guidance from other inputs thereto, to operate in a learning mode and systems embodying such self-organizing circuits.

44 Claims, 25 Drawing Figures

SELF-ORGANIZING CIRCUITS FOR AUTOMATIC PATTERN RECOGNITION AND THE LIKE AND SYSTEMS EMBODYING THE SAME

BACKGROUND OF THE INVENTION

The present invention relates to systems that include mechanisms operable to receive information and to analyze that information on the basis of a learning mode of operation.

Pattern recognition includes the ability of a circuit to detect a pattern among variables despite the fact that the pattern is not precisely the same pattern as was previously learned. The variables can be considered as any variable or set of variables from which a signal can be formed, in some way functionally related to the variables considered. The types of variables fall into two broad categories: static variables and time-varying variables. For example, when a color-blind person tries to distinguish between letters or numerals of pastel dots, he is given static variables or static information. Time-varying variables for which patterns might be recognized include audio signals, for example a person trying to distinguish between the dash and dot patterns he hears in a Morse code signal.

Clearly living organisms can accomplish this task of pattern recognition. People can recognize static information such as printed material (as the reader of these very words is now doing) and time-varying information such as how to swing a tennis racket so as to make proper contact with a tennis ball. Lower life forms also have this ability: certain ant species can recognize the foliage cover near their nests to orient themselves; certain moths can recognize the high-pitched sounds of a bat to avoid being captured; and even clams can learn primitive patterns of tactile responses which distinguish food from danger. Living organisms use electrochemical signals in the neurons of their brain or ganglion to perform this pattern recognition function.

While very complicated computers have been built which can do enormous numbers of calculations at speeds far exceeding the simple calculations done by house flies and clams, the ability of such computers to perform pattern recognition at the level of these primitive organisms has not been forthcoming. A major difference is that people tell the computers what to do whereas flies and clams tell themselves what to do. The former are essentially preprogrammed to do certain sequences in attempts to recognize patterns in space or in time while the latter self-organize themselves to "learn" to recognize patterns which are important to them. In each case, a certain amount of information is already known: in the computer it is a programming language (software) plus the myriad of interconnections in its circuitry; in the living organism it is its instincts or programmed patterns plus the myriad of interconnections in its neural circuitry.

Circuits made of wires and transistors and other electronic components could do well to have the ability to self-organize or learn as living organisms do. These circuits could lead directly to a machine which recognizes speech or recognizes handwriting among other tasks. A misconception is that people think but computers do not think—computers do only what people tell them to; however, self-organizing circuits of the type herein described mimic the ability of the brain to think or at least to do a major subtask of thinking which is pattern recognition. Hence, the line between a computer thinking and a person thinking becomes a fuzzy one.

To place the present invention in context, examples of the types of systems within which the concepts disclosed herein can be employed include the systems in U.S. Pat. Nos. 3,675,203 (Baumann); 4,040,011 (Crane et al.); 4,200,921 and 4,095,475 (Buckley, the present inventor).

OBJECTS AND SUMMARY OF THE INVENTION

An object of the present invention is to provide a method by which a circuit can organize itself into a system which can recognize patterns, which are both static (non-time varying) and time-varying (dynamic).

It is a further object of the invention to provide novel analog and digital circuits which have the ability to learn from previous experiences as a way to self-organize. These circuits have the ability to "remember" patterns for which they were rewarded and also to "forget" patterns for which they were punished. The learning can be accomplished wholly prior to the use as a pattern recognizer; the learning can occur in conjunction with use of such circuits as a pattern recognizer; or certain information can be learned by one circuit or system and this information can be transferred to other circuits which can operate in either of the first two modes (learn-then-recognize or learn-and-recognize simultaneously).

Another object of the invention is to provide primarily analog methods of accomplishing self-organizing, to provide primarily digital methods of self-organizing and also to provide variations which include some analog circuitry combined with some digital circuitry to accomplish self-organizing.

A further object of the invention is to provide substantially parallel circuitry which accepts multiple inputs from other similar circuits, to act on these inputs, and to output signals to yet other similar circuits. In addition, provision is made to connect such similar circuits in a combination of parallel and serial manner: parallel manner meaning two or more of the similar circuits acting simultaneously; serial manner meaning that one or more of the circuits act only after another has acted.

A further object of the invention is to provide both electrical and non-electrical means by which these circuits can self-organize. Non-electrical means include pneumatic, chemical, optical or other means which obey the rules set forth for self-organizing as described herein.

Yet another object of the invention is to provide specific embodiments of circuits which can preprocess information into a form acceptable to the self-organizing circuits. The two types of information fall generally into the classes of static and time-varying information. An example of the former is visual information patterns representing printing or handwriting; an example of the latter is audio information such as recognizing patterns of speech or music.

Another object of the invention is to provide an architecture of similar self-organizing circuits. The organization or architecture is composed of a heirarchy of levels, lower levels passing on information to higher levels in such a way as to improve the self-organizing ability and ease of learning for the system as a whole.

Still another object of the invention is to provide means for initializing similar circuits with similar input signals such that self-organizing can progress in a non-deterministic way as the system of circuits proceeds in the learning process. Included is a provision for matching the learned responses to various patterns with useful names or identifications which the operator of such a system of circuits might wish.

Another object of the invention is to provide methods by which information between different elements or subcircuits of the self-organizing system can be transmitted by time-variations of signals. These time variations encompass the range between simple changes between two or more signal levels (e.g., binary data), to pulses whose width or rate (or coded sequence of widths or rates) carries the information, the purpose being to reduce the number of inter-connections between various elements or sub-circuits of the system.

Yet another object of the invention is to provide a self-learning circuit or system of circuits. While previous objects of the invention set forth that if a self-organizing circuit is taught pattern recognition tasks by rewarding or punishing elements of that circuit to produce desirable results, this suggests that an external source provides specifically which patterns are to be rewarded or punished. But the patterns to be learned may also be random, though still punished or rewarded by some criterion. In this case the circuit randomly initiates its own patterns and is rewarded or punished. However, if the pattern is punished, it tends to be eliminated from those patterns which the circuit is testing; if the pattern is rewarded, it is encouraged to be used again. For example, living organisms use this form of self-learning: a baby puts its hands on all sorts of objects at random but soon learns to eliminate hot stoves and thorns as objects to grasp. Self-learning of this type is a primitive form of conceptual thought; circuits which accomplish this function are disclosed herein.

Yet another object of the invention is to provide a method by which sequence of information in patterns is detected. While in many cases unordered information is satisfactory (a dozen eggs is a dozen eggs no matter which order they are taken from the box), some information is ordered and the exact nature of the ordering is critical for the patterns to be recognized. For example, in recognizing the pattern of letters which produce words, the two letters "A" and "M" taken together as a word have completely different meanings depending on order. An object of this invention is to provide circuitry which determines ordering and sequencing in patterns of both the static and time-varying varieties.

The invention is described hereinafter with reference to the accompanying drawing in which.

DESCRIPTION OF PREFERRED EMBODIMENTS

Figure 1:
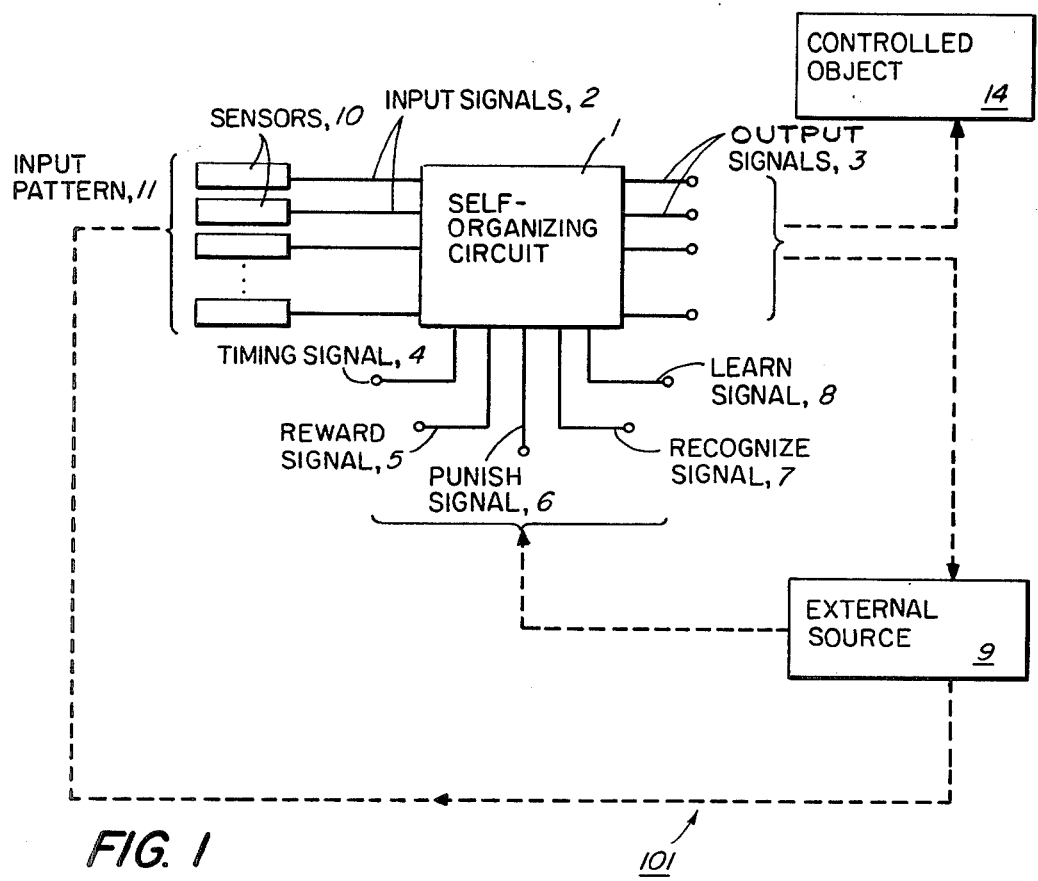
FIG. 1 is a diagrammatic representation of a system that includes a self-organizing circuit of the present invention.

There now follows a brief explanation of the invention with reference to FIG. 1 which shows a system 101 that includes transducers or sensors 10 to sense an environmental condition or some other input pattern thereto at 11. The sensor or sensors 10 are operable to process that input to provide an input signal at 2 which includes information to be analyzed. A self-organizing circuit 1, connected to receive that input signal, is operable to effect analysis of components of constituent elements of the input signal and to provide an output signal at 3. In the discussion which follows, the various signals as well as the entire inner workings of self-organizing circuit 1 are assumed to be electrical signals. This need not be the case since analagous circuits can be derived which are non-electrical. For example, the self-organizing circuit 1 could be implemented in fluidics using pressure signals instead of voltage signals or in thermics using temperature signals instead of voltage signals (see, for example, U.S. Pat. No. 4,137,964 by Buckley, the present inventor). However, for simplicity, further discussion will consider only the electrical implementation as the preferred embodiment.

Figure 2:
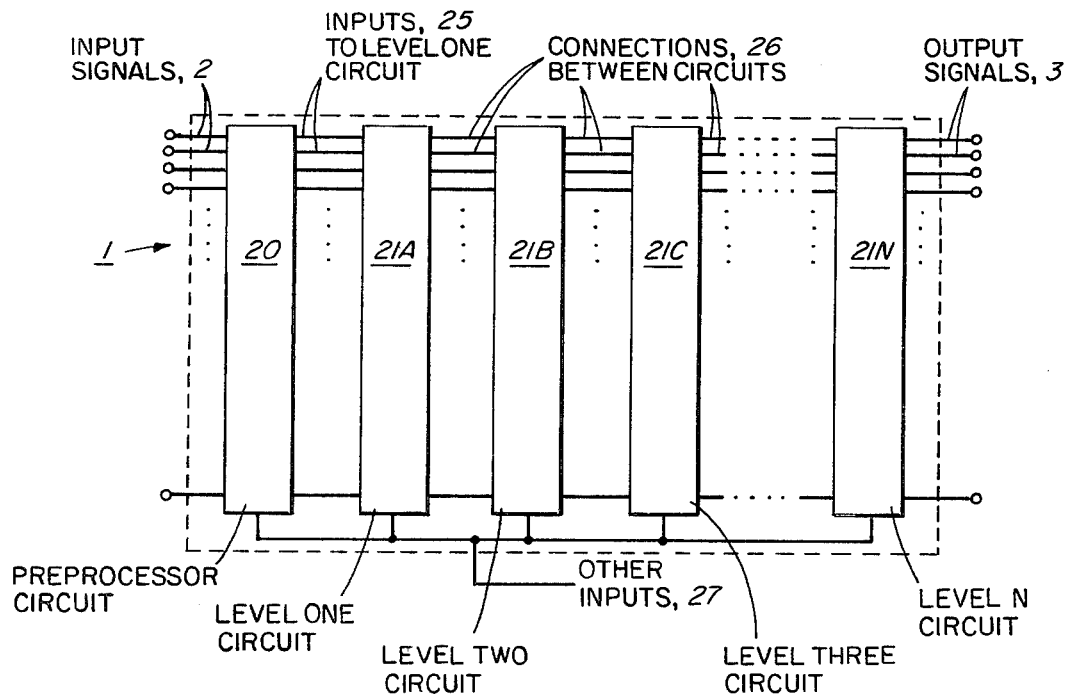
FIG. 2 is a diagrammatic representation of one form the self-organizing circuit of FIG. 1 can take, and shows a self-organizing circuit that includes a preprocessor circuit and a plurality of subcircuits or level circuits.

An external source 9 (e.g., a computer), as explained later herein, is connected to apply modified inputs at inputs 5, 6, 8 and 7 (e.g., a reward signal, a punish signal, a learn signal and a recognize signal, respectively) to the self-organizing circuit 1; the input signals at 5, 6 . . . serve to correct errors in the output signal at 3 occasioned by inaccurate analysis by the self-organizing circuit. A timing signal may be applied at 4 for purposes later discussed. Typically, the self-organizing circuit 1, as shown in FIG. 2, consists of several interacting elements. The system 101 may contain a controlled unit 14 (e.g., a mechanical mouse, whose functions are directed by signals 3 from the self-organizing circuit). (In order to simplify the explanation herein, the label 2 designates signal paths or the like interconnecting the sensors 10 and the self-organizing circuit 1, but hereinafter 2 is used also to designate the signal on those paths; and a similar approach is used as to other labels and the things they represent.)

In the description that follows, the self-organizing circuit 1 will be discussed. Generally, the circuit 1 has many parallel signals 2 as input; they are usually binary: electrical signals having either one or another of two states (e.g., a high voltage and a low voltage). The signals 2 are fed into the circuit 1 which organizes the inputs to provide various signals 3, deemed by an external source 9 to be either desirable or undesirable. In some cases it is necessary for this outside source (e.g., a computer operating the circuit) to identify which output signals 3 are associated with desired input patterns 11.

In addition to the signals 2 and 3, certain other signals to the circuit 1 may be required. First, a timing signal 4 may be required to initiate various modes of operation of the circuit, for example, learning mode or recognizing mode. The timing signal 4 can be a simple binary signal or perhaps a series of such signals as are currently used on digital computers for sequencing events. Secondly, reward signals 5 and punish signals 6 are other examples of input signals initiated by the external source 9 or an operator whose inputs pass through an appropriate device 9. A reward signal 5 tells the circuit 1 that a pattern 11 which it recognized was a correct one; a punish signal 6 tells the circuit 1 that a pattern 11 which it recognized was an incorrect one. Other signals which may be required are a learn signal 8 and a recognize signal 7. A more primitive form of the circuit 1 can have a learn mode initiated by the learn signal 8 (during which it learned only to recognize patterns) followed by a recognize mode initiated by the recognize signal 7 when it used the organization provided by the learning mode to perform useful recognition tasks.

The external source 9 used to monitor the circuit 1 can be of several types. It can be a mechanism that permits a human operator to direct the circuit 1 as mentioned above, it can be a mechanism that permits the environment to direct the circuit 1, or it can be another electronic circuit which recognizes the correctness of a response to a pattern 11 and rewards or punishes the circuit 1.

The input patterns 11 can be provided in several ways by the external source 9 as suggested above. These patterns 11 can be patterns presented to the circuit 1 by the human operator or the environment appropriately transformed into the proper binary mode electrical signals for use in circuit 1 by the sensors 10. The sensors 10 can measure any of the common variables used in engineering disciplines. A partial list of the sensors 10 include optical or light sensors, quantity sensors, radiation sensors, frequency varition sensors, auditory sensors, stress or strain sensors, position sensors, acceleration sensors, temperature sensors, heat flow sensors, time sensors, chemical composition sensors, proximity sensors, voltage sensors, current sensors, magnetic field sensors and force sensors. The electrical inputs at 2 can also be the output signals of another self-organizing circuit, as later discussed with reference to FIG. 2.

In addition to patterns 11 derived from the environment (or some other source of information) by the transforming sensors 10, the inputs may be triggered randomly by the circuit 1 itself as it explores ways in which to reward or punish. The self-organizing circuit 1 can adjust itself or accommodate to an environment with little prior knowledge of what the environment is. For example, if the inputs 2 to the circuit 1 represent each of four directions to which a mechanical mouse 14 controlled by the circuit 1 can turn at each cell within a planar, cartesian maze, the reward might be given for traversing a shorter path through the maze and a punishment given for traversing a longer path. Initially, the mouse 14 randomly picks directions and eventually finds its way through the maze. But as it tried more and more times it is rewarded for shorter routes and punished for longer routes; the self-organizing circuit 1 tends to find the shortest path by eliminating long routes and encouraging short routes.

The input patterns 11, which can represent analog information, can be transformed into digital binary data by the Albus Method (BYTE magazine, July 1979, p. 61, James Albus). In this method, several sensors 10 act over the range of some analog variable. The responses of the sensors 10 overlap various arbitrary values of the analog variable such that any particular analog value is represented by several simultaneous digital signals by some subset of the total number of digital sensors 10. Information such as audio information, whose time varying characteristic periodicity is not appropriate for the circuit 1 (e.g., is at too high a frequency), can be represented by overlapping filters (as the sensors 10) whose outputs 2 indicate various frequency bands which the audio information contains. These sound spectrograms or voicegrams are standard representations of audio information; digital decomposition of the audio signal into constituent frequencies is a common technique for transmitting acoustic information digitally as will be discussed later. Similarly static frequency patterns such as spectrographs, can be decomposed into a number of discrete frequencies and/or amplitudes for recognizing the patterns of compositions and the like. The focus of this invention is not how the various input sensors 10 derive binary information but, rather, how the electrical signals 2 self-organize to form the recognition signals 3.

Just as the input signals 2 are derived from input sensors 10, the output signals 3 can interact with the external source 9 (or some controlled unit 14) in various ways. If the external source 9 is the environment, it might include such output devices as motors which operate manipulator hands (which could be considered to be the controlled unit 14), valves in hydraulic circuits or innumerable other ways in which the electrical signals 3 alter the environment through mechanical, electrical, thermal, hydraulic or chemical amplification of the electrical output signals 3. The output can also be simply information as used by another electrical circuit or computer. This invention does not primarily concern itself with what the output signals 3 are used for, except perhaps as they directly or indirectly affect the other signals operating on the circuit 1, as previously described.

The principal aspect of the present invention is the way in which the self-organizing circuit 1 is able to organize itself in various ways. In fact, the invention described attempts to mimic, as closely as possible, the function, as perceived by the present inventor, of groups of brain cells or neurons, but by means which can be produced as electrical circuits fabricated in a factory rather than by the subtle conbinations of hydrocarbons and other molecules upon which living systems rely.

A brief description of how neurons and groups of neurons work (as perceived by the present inventor) is in order to explain fully how self-organizing circuits can recognize patterns and in some cases can self-learn. Current research in brain cells suggest that the neurons of interest follow several rules (see *Scientific American*, September 1979 for an excellent discussion of recent brain research). Some of the rules are summarized below.

First, "thought" neurons—those found generally in the cerebral neocortex—tend to be nearly identical in function but replicated by the millions. Each has more or less the same duties: it takes in information from other neurons and decides by some criterion whether it should fire (i.e., pass on information to yet other neurons). Thought neurons are the neurons which the self-organizing circuits herein attempt to emulate. Other types of neurons have special tasks associated with information and muscle control. For example, specialized neurons in the retina organize spatial and temporal information information sent to the neocortex via the optic nerve—preprocessing the information. Other specialized neurons are used to stabilize muscle cells with the proper feedback to do complex motor functions.

The thought neurons tend to be aligned in more or less levels or layers in the neocortex. The axons of neighboring neurons tend to be aligned such that neurons of one level receive information from levels below and transmit information to levels above. Thought, then, is a recursive process—the same functional units (the neurons) are used for the process: they simply get connected together in different ways to represent different thoughts or patterns. Thought at any level is the same as thought on any other level: a combination of patterns which in turn is a combinations of other patterns. In this context, the neural connections associated with a patent examiner trying to understand a claim in a patent application is no different than the neural connections associated with a child learning to read, which is no different than the neural connections associated with a clam learning to close its shell. All represent neurons connecting themselves in the proper way to form signals which are rewarded or punished.

A second rule is that many (perhaps most) neurons vote. Voting here means that each accepts digital information from other neurons connected to it, weighs the relative amounts of negative and positive influences and vote as to whether or not to pass along information to other neurons connected to it (i.e., to fire). A complication is that while the information sent down an axon is either a pulse or not a pulse, the rate at which the pulses are sent is influenced by the inputs or their rate. An analogy is to think of a neuron as a bucket into which water from several or many possible faucets pours, and out of which water from several or many possible plugs leaks. The neuron fires if the water in the analogous bucket gets too deep—more water pours in than leaks out. It votes on whether to fire depending on the particular combination of faucets turned on and leaks unplugged. Different combinations of the inputs (i.e., faucets and plugs) can cause the same neuron to fire (i.e., bucket to fill).

In a very contrived analogy, let it be supposed that the bucket, on filling to a certain level, pulls on ropes which are attached to the faucets or plugs of yet other buckets above it. By analogy, when the neuron fires, it causes synapses at the terminal ends of its axon to open or close pores in other neurons; the pores either let in or let out certain charged ions which could cause that neuron to fire. A third rule of neurons, then, is that a firing neuron can trigger other neurons to fire (excitory action) or not to fire (inhibitory action). The mechanism by which this is accomplished is the same—insofar as the triggering neuron is concerned; only the pores of the triggered neuron determine whether the action is inhibitory or excitory.

A fourth rule is that the "paths" are rewarded or punished. Paths are strings of neurons which are firing during a particular recognition task. In the neural case, this implies that the synapses (or connections) between these strings of neurons become stronger paths the more they are used for rewarded endeavors and become weaker paths the more they are used for punished endeavors. Stronger paths in the neural sense means that the triggering neurons in the string have a greater tendency either to inhibit or excite action from the triggered neurons. A weaker path means a synapse will have less effect towards inhibiting or exciting the neuron to which it is attached. In addition, new synapses or neural connections can grow or others can die to further reinforce this action (see *Science*, Vol. 210, No. 4466, Oct. 10, 1980, p. 153). In the bucket analogy, reinforcement of path connections might be the equivalent of oiling a sticky faucet knob or a corroded hinge on a leak's plug: a much-oiled faucet or plug will have a bigger effect on filling or emptying a bucket.

As path connections are reinforced either positively or negatively, patterns are recognized. Consider a certain neuron whose task is to recognize the letter "A". Suppose its inputs to be other neurons which represent a multitude of primitive components of all letters. These might be neurons representing vertical lines, left-pointing diagonals, right-pointing diagonals, horizontals, cross-intersections, "T"-intersections, quartercurves facing up, half curves facing left, and on and on. Certain combinations of these components would represent the letter "A", for example the set: horizontal, left-diagonal and right diagonal in combination would fire the "A" neuron. Each time this combination occurred (and the pattern was indeed an "A" and therefore rewarded) the neurons which participated in that recognition would have stronger connections, allowing another letter "A" in the future to be more easily recognized. However, if the pattern were the letter "V", the left and right diagonal neurons would fire which might also cause the "A" neuron to fire. In this case the left and right diagonal neutral connections would be punished—be made more difficult to cause the "A" neuron to fire. With the proper connections and the accumulation of experience (through which the neural paths are rewarded or punished), the "A" neuron can come to distinguish between the correct set of components and the incorrect ones.

Of course the process is much more complicated than this because more inputs than just two or three possibilities are presumably used by the brain. Neurons can have as many as a million inputs. Moreover, concepts such as position of the elements with respect to one another are important—else how can one determine the difference between a lower case "b" and a lower case "d". Further, each letter might be represented by more than one neuron; only in this simple example did the interconnections form such simple combinations. However, the thought process is believed to occur in the manner suggested for static patterns such as reading letters as well as for time-varying patterns such as understanding speech. In fact, experimenters in artificial intelligence have been able to simulate these path-reinforcing algorithms on digital computers for simple robotic systems; the systems can learn a coordination much as a human might (see, for example, "Robot Systems", *Scientific American*, February 1976).

A final rule the present inventor must infer from intuition: how does the whole process start? One can easily imagine in the example above that once the "A" neuron got many reward signals associated with a horizontal, a left diagonal and right diagonal, it would fire whenever that combination occurred. But how does the "A" neuron know its task is to be an "A" neuron? It is concluded for the present purposes that initially many of the same inputs feed into many different neurons; any would have an equal opportunity to fire. Those which fire are rewarded so that on a later occasion they will have a greater tendency to fire. In addition, the present inventor believes that neurons which fire tend to inhibit other neurons from firing. As the process continues the neurons tend to sort themselves out—one representing more and more the "A" pattern, another the "B" pattern and so forth. Two sub-rules are implied here: one is that early on in the learning process random firing initially selects pattern; the other is that a neuron which fires inhibits from firing other which are trying to recognize the same pattern. If each learning experience is identical (e.g., each letter "A" looks identical to the previous), the process might not converge to a particular neuron representing a particular pattern. Fortunately, each is not identical; so (apparently) one can learn to read.

While an electrical circuit used to recognize letters or speech may be quite concerned with which neuron represents which letter, the present inventor believes that the brain is not. Only so far as a neuron represents some pattern (which is itself a subcomponent of other patterns), does the brain care about naming, the process of identifying an output with a pattern. A circuit however which, say, accepted an audio speech signal and converted it into a typed letter—a prime candidate for application of the present invention—certainly needs to identify a randomly chosen signal (which fired in response to a pattern) with that same pattern.

Understanding how neural connections are probably made in the brains or ganglia of living organisms guides the invention of similar electric circuits which provide the same function. To elucidate the different aspects of this invention, the circuit 1 of FIG. 1 is subdivided into subcircuits called levels, as shown in FIG. 2. The signals (typically binary in form) from the sensors 10 of FIG. 1 feed first into a preprocessor circuit 20 whose outputs are inputs 25 to a level one circuit 21A; outputs of this level connect to a level two circuit 21B via connections 26. Each level one circuit 21A through level N circuit 21N has outputs 26 which act as inputs to the next higher level: the level one circuit 21A feeds its outputs 26 to the level two circuit 21B, which feeds its outputs 26 to the level three circuit 21C, and so forth until the last level N circuit 21N is reached. The output of the level N circuit 21N is the output signals at 3 of the circuit 1.

This hierarchical form is not the most general; it is presented only to simplify the explanations which follow. As in neural connections, there can be feedback signals which in some cases connect from a higher level to a lower level, e.g., the higher level circuit 21B might connect to the lower level circuit 21A, via interconnections 26, but with a signal flow from the level two circuit 21B to level one circuit 21A rather than from the level one circuit 21A to level two circuit 21B, as previously suggested. Moreover, the different levels can pass through a signal from a lower level to a higher level; thus output signals of one level can be available as input not only to the next higher level, but to levels even farther up the hierarchical chain. For example, the preprocessor circuit 20 can have its outputs go into the level one circuit 21A, which may then be sent on to level two circuit 21B such that both the level one circuit 21A the and level two circuit 21B have the outputs of the preprocessor circuit 20 available for acting upon. Lastly, the FIG. 2 illustration is not meant to imply that the same number of inputs would interconnect all the subcircuits shown; in general, there may be more or less interconnections 25 and 26 between two particular levels than between two other levels.

Also shown in FIG. 2 are other inputs 27 which are fed to all circuits. These other inputs 27 are meant to include signals such as the timing signal 4, the reward signal 5, the punish signal 6, the learn signal 8 and the recognize signal 7 in FIG. 1.

In FIG. 2, the preprocessor circuit 20 has been distinguished from the level circuits 21A through 21N because the circuit 20 has no self-organizing capability. The preprocessor 20 (as later explained in greater detail) acts in a programmed manner on the input signals 2 to convert them into the signals 25 which will facilitate the self-organizing capability of the self-organizing level circuits 21A through 21N. The form the preprocessor circuit 20 takes depends to a great extent on the patterns which the circuit 1 is attempting to recognize, whether static or time-varying, and also upon the types of sensors 10 used to generate the signals 2 fed into the circuit 20.

The important facet of the self-organizing circuit 1 is not the preprocessor circuit 20, but, rather, the level circuits 21A through 21N. The preprocessor circuit 20 is discussed later with regard to specific tasks which the circuit 1 might perform. Examples used are a static pattern recognition task (recognizing letters of the alphabet) and a time-varying pattern recognition task (recognizing speech). Each type of pattern recognition task requires a specialized preprocessor circuit 20 which is especially designed for the specific task.

Before considering just how self-organizing circuits such as circuit 21A can operate, consider an alternate pattern recognition method characterized by direct connections rather than self-organization. Level circuits such as the circuit 21A might be built directly connecting inputs such as 25 in FIG. 2 to outputs such as 26 by use of standard electronic components such as inverters and transmission gates (to be discussed in more detail later); a particular combination of inputs 25 can be used to trigger a desired output 26. For example, if the inputs signals 25 represent all the primitive components of letters (i.e., verticals, curves, horizontals, diagonals and so forth as discussed earlier), then the outputs at 26 can be signals representing letters such as "A", "B" and so forth. Using direct connections, the three components: left diagonal, right diagonal and horizontal can all be connected through transmission gates to produce an output signal associated with the letter "A". Similarly, another set of components might be directly connected to represent the letter "B" and so forth for all the letters.

Unfortunately this direct connection tactic—which is used in some of today's commercial "reading" machines—does not produce the characteristics needed to make a truly self-organizing circuit. The circuit is deterministic: only the proper inputs 25 will trigger an output 26 and no others will. Slight variations of the inputs will not lead to the correct output. For example, a poorly written capital "A" may be composed of a vertical, a diagonal and a horizontal; so the above-described circuit can not respond to this letter "A". In fact, there are many, many possible combinations of capital "A" which all need to be directly connected to the "A" output connection in order that it produce an output signal. Thus, to include all the possibilities a great many interconnecting combinations of the inputs 25 need to be connected to each output 26. Hence, direct connection schemes are either very deterministic or they necessarily must have many interconnection combinations between the inputs 25 and the outputs 26. These types of circuits do not really learn to pick the best output 26, given a combination of inputs 25, but merely include all the possible combinations of inputs. Moreover, direct connection circuits do not obey the rules of neurons as set forth earlier: there is no "voting"; there is no "path reinforcement."

Figure 3:
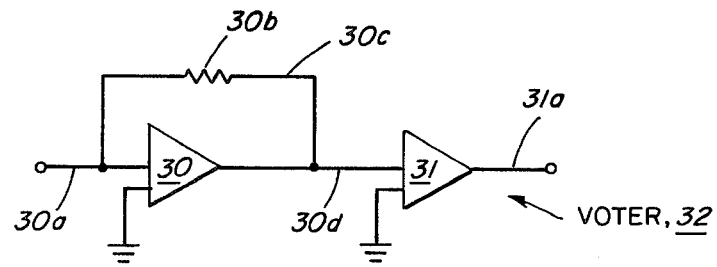
FIG. 3 is a schematic representation of a multiple-input summing junction.

Self-learning circuits, as opposed to direct connection circuits, do "vote" and do have "path reinforcement." In an analog circuit, voting can be implemented by the multiple-input voting circuit or "voter" shown at 32 in FIG. 3. The voltage output signal at connection 30d is proportional to the sum of the currents—i.e., the total current —input at connection 30a. A high-gain amplifier 30 assures that the current at 30a multiplied by the resistance of a resistor 30b, connected via feedback path 30c, equals the voltage at the connection 30d. A subsequent high gain amplifier 31 outputs a binary voltage signal at connection 31a, depending on whether the voltage at 30d is positive or negative. The binary signal at the connection 31a has one of two states, thus specifying whether the voter 32 has fired: if the summation of currents into the connection 30a is positive, the voter 32 fires (i.e., attains one state at the connection 31a); if negative, it does not fire (i.e., stays at the other state at the connection 31a). Henceforth, the term "active" state will be synonymous with a binary one meaning that a particular binary device has fired; an "inactive" state will be synonymous with a binary zero, meaning that the device has not fired.

Path reinforcement, another requirement of a self-organizing circuit, can be accomplished by using digital-to-analog converters (DACs). A DAC takes a multi-wire digital input signal and converts it to an electric current—the electric current being proportional to the binary weighted value of the input signal. One simple DAC can be made of C-MOS (complementary-MOS) inverters and transmission gates, as shown in FIG. 4A, FIG. 4B, FIG. 5A and FIG. 5B.

Figure 4A:
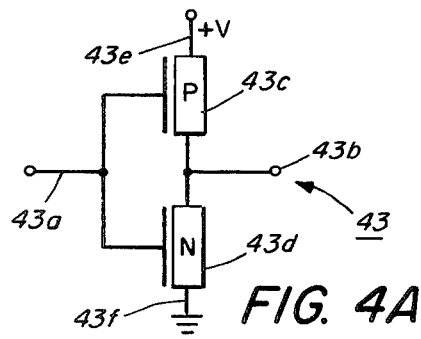
FIG. 4A is a diagrammatic representation of an inverter whose shorthand symbol is shown in FIG. 4B.
Figure 4B:
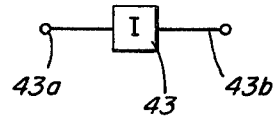

An inverter 43 is shown in FIG. 4A; its shorthand symbol is shown in FIG. 4B. Connection 43a is the input connection to the inverter 43 through which a voltage signal is fed. A positive voltage signal at the connection 43a turns the P-channel MOS element 43c OFF while simultaneously triggering ON an N-channel MOS element 43d, which causes the voltage at the output connection 43b to drop to the ground state voltage (0) which is provided at connection 43f. In a similar manner, a negative voltage at the connection 43a causes the output voltage at 43b to rise to the positive supply voltage (+V) provided at connection 43e.

Figure 5A:
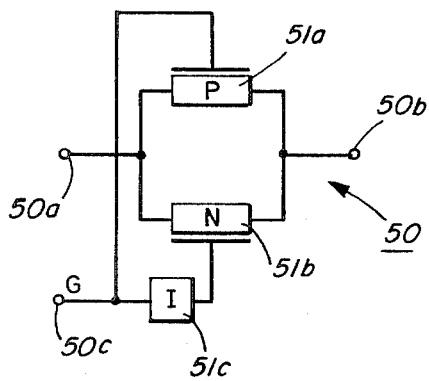
FIG. 5A is a diagrammatic representation of a transmission gate whose shorthand symbol is shown in FIG. 5B.
Figure 5B:
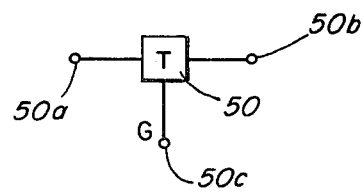

A transmission gate 50 is shown in FIG. 5A; FIG. 5B shows its shorthand symbol. An input current signal at connection 50a in FIG. 5A is transmitted through either a P-channel MOS element 51a or an N-channel MOS element 51b if the gate signal labeled G at connection 50c is in one binary state; but no current is transmitted if the gate signal G is in its other state. An inverter 51c insures that 51a and 51b are either both ON (so current can flow in either direction between connections 50a and 50b) or both OFF.

Figure 6A:
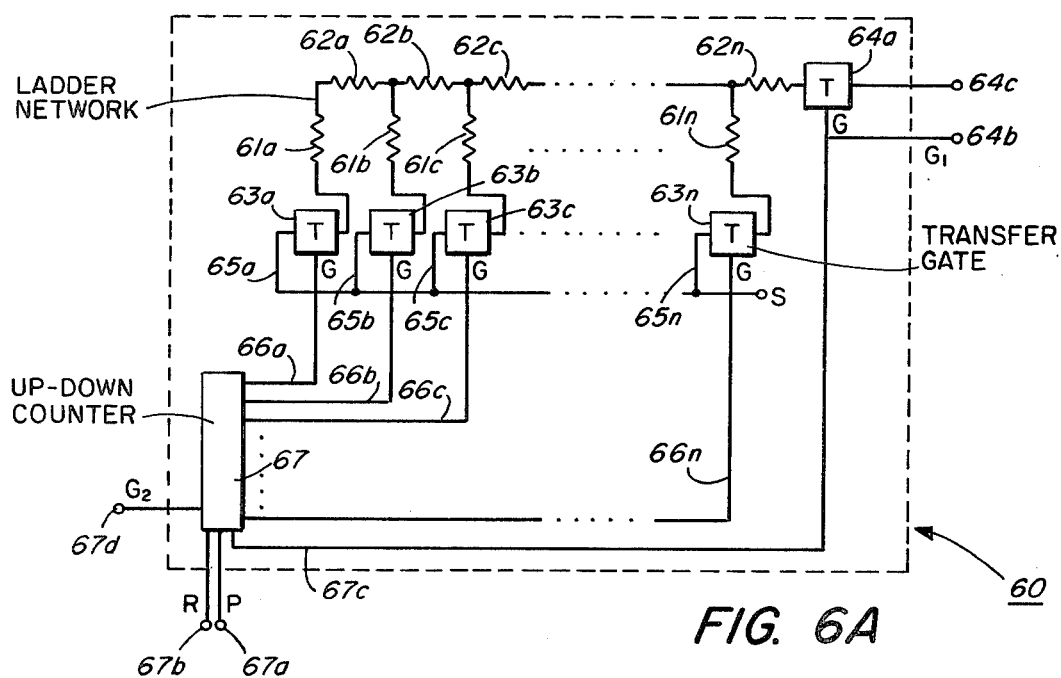
FIG. 6A is a diagrammatic representation of a digital-to-analog converter (DAC) whose shorthand symbol is shown in FIG. 6B.
Figure 6B:
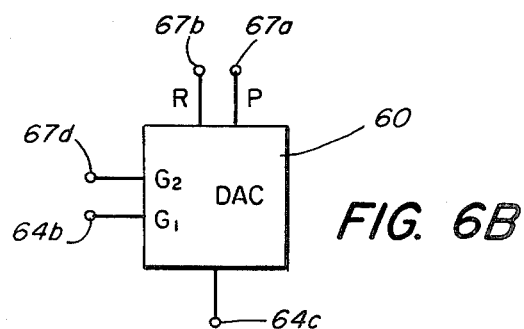

The digital-to-analog converter (DAC) marked 60 in FIG. 6A is composed of a ladder network of resistors 61a ... 62n; FIG. 6B shows a shorthand symbol for the DAC 60. Note that other DACs than the "binary-weighted" DACs discussed here are possible. For example, a sequentially-loading DAC based on charge-coupled devices or bubble memories may be used in other designs of self-organizing circuits. Resistors 61a ... 61n are sized properly with resistors 62a ... 62n such that when a set of transmission gates 63a ... 63n is enabled by the binary number in an up-down counter 67, the current output fed to the transmission gate 64a is proportional to the value of a binary number stored in the counter 67 and applied to the transmission gates via connectors 66a ... 66n. One of the signal inputs of each transmission gate 63a ... 63n is connected to a supply voltage labeled S which can be either positive or negative; a positive supply S will produce a current flow into the transmission gate 64a, a negative supply S will drain current from the transmission gate 64a. A gate signal 64b labeled $G_1$ allows current to flow through the transmission gate 64a to the output connection shown at 64c.

The DAC 60 works as follows. Each connection 66a ... 66n represents a bit of the binary number stored in the up-down counter 67. Hence, if the binary number in the counter 67 is zero, no signals will be present at connections 66a ... 66n and none of the transmission gates 63a ... 63n will allow current to flow to or from the supply connections shown at 65a ... 65n; in this circumstance, the output current at 64c will be zero when the gate $G_1$ is enabled. If the binary number in the inverter 67 is "all ones", all the transmission gates 63a ... 63n will allow current to flow and the current flow into or out of the connection 64c will be its maximum when the gate $G_1$ is enabled. Any binary number between zero and "all ones" will cause a current flow at the connection 64c proportional to the value of the binary number in the counter 67, current being drawn into the DAC 60 for a negative supply and current flow out of the DAC 60 for a positive supply.

The up-down counter 67 is a particular type of binary register which counts up (the binary value of signals 66a ... 66n is incremented by one) each time it receives a reward signal 67b (at terminal R in FIGS. 6A and 6B) and counts down (the binary number is decremented by one) each time it receives a punish signal 67a (at terminal P in FIGS. 6A and 6B). A reward signal 67b adds the binary number one to a binary number stored in the counter 67; a punish signal 67a subtracts the number one from the counter's binary number. The binary number is stored in the counter 67; it remains the same whether or not signals are transmitted via connections 66a ... 66n or not. Only the punish or reward signals, 67a and 67b, respectively can change the values of the counter 67. In the configuration shown, the $G_1$ gate input signal 64b also enables the up-down counter 67 via a connection 67c; hence the punish and reward signals 67b and 67a can only cause a change in the counter 67 when the $G_1$ gate signal 64b is activated. In other configurations, a separate counter enables signal 67d at terminal $G_2$ may be required. In this case, the connection 67c to the gate G₁ is eliminated so that the counter 67 is enabled only by an independent signal at 67c and not by the gate signal at 64b.

In operation, the DAC 60 accomplishes "path reinforcement." In FIG. 6B, a current flows into or out of the connection 64c, according to how much it has been rewarded or punished, when the gate G₁ is enabled by the signal 64b. A highly rewarded and little punished DAC 60 will have a large current flow; a highly punished and little rewarded DAC 60 will have little current flow. While these circuits have been shown in a C-MOS implementation, it should be noted that similar circuits can be designed in many other types of electronic implementation. In addition, the effect of inhibiting or reinforcing a signal is shown here simply by the choice of supply voltage for the DAC 60; a more complicated circuit as discussed later in more detail may well have the sign of the DAC 60 supply voltage determined by the binary number stored in the counter 67. Hence, in this latter variation, a much-punished DAC 60 would drain current from the connection 64c while a much rewarded DAC 60 would add current to the connection 64c.

Figure 7A:
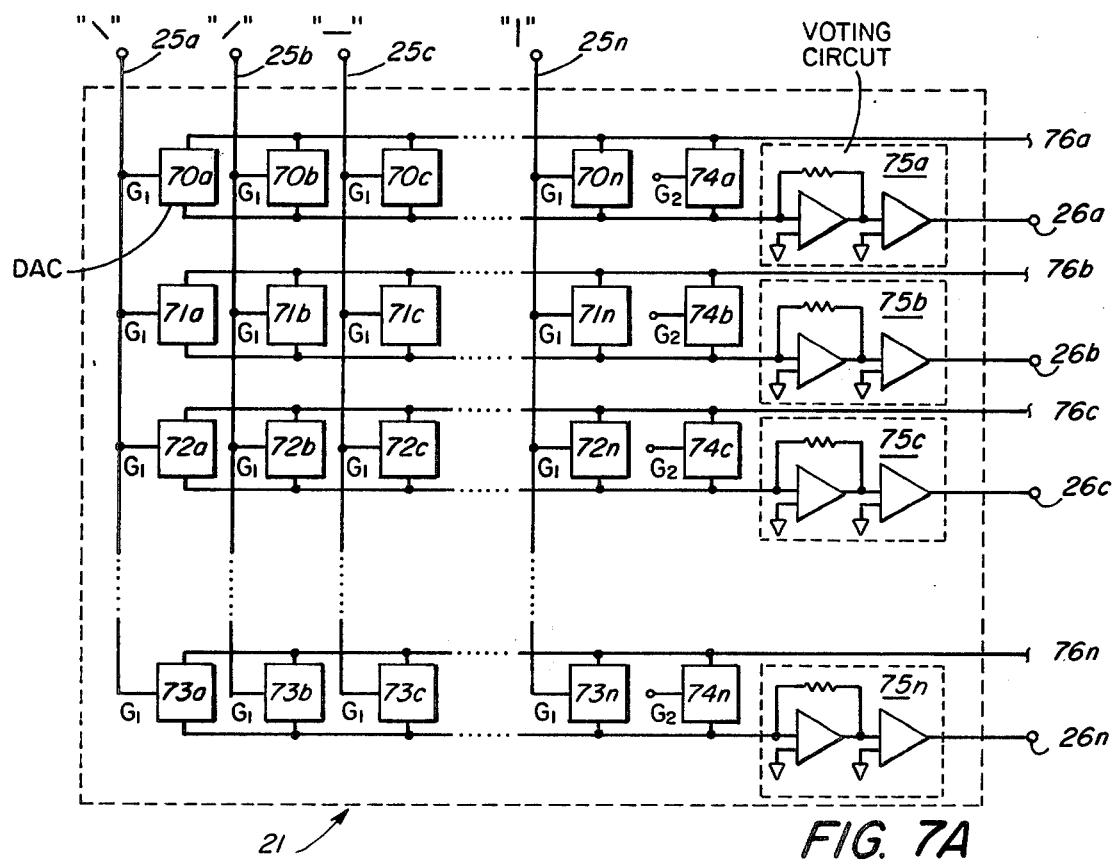
FIG. 7A is a diagrammatic representation of one form the subcircuits or level circuits of FIG. 1 can take.

Shown in FIG. 7A is a simple configuration whereby a plurality of DACs (like the DAC 60) and a plurality of voting circuits (like the voting circuit 32) are combined to give a level circuit 21. The circuit 21 on FIG. 7A is meant to imply any of the self-organizing level circuits of FIG. 2 (e.g., circuits 21A . . . 21N). Inputs to the circuit 21 are denoted as connections 25a . . . 25n; each input signal 25a . . . is connected to every column of DACs. For example, the connection 25a routes an input signal to the first DAC in every row (i.e., DACs 70a, 71a . . . 73a); the connection 25b routes its signal to the second DAC in each row (i.e., DACs 70b, 71b . . . 73b). The input signals 25a . . . 25n are connected to the G₁ gate inputs (i.e., the input 64b in FIGS. 6A and 6B) of each respective DAC as discussed with reference to FIG. 6B; in this case, only a single gate enable signal 64b is used (G₁) and the independent counter enable signal 67c does not exist (G₂). More complicated circuits may use independent enable signals, but this circuit—shown only to better understand the level circuit 21—is simplified to only a single enable signal 64b for both the counter 67 and the transmission gate 64a in FIG. 6A.

Besides the "path-related" DACs 70a through 73n, the circuit 21 also has "threshold" DACs 74a . . . 74n. A threshold DAC 74a . . . 74n is one which draws current from respective voting circuit 75a . . . 75n (e.g., like the summing junction 32 in FIG. 3). By contrast, the "path-related" DACs 70a through 73n add current to the respective voting circuits 75a . . . 75n. The purpose of the threshold DACs 74a . . . 74n is to insure that input signals to the voting circuit 75a . . . 75n are offset properly as more and more learning experiences occur; this will be discussed in more detail later.

The outputs of all the DACs 70a . . . 74n either add or drain current from their respective voting circuits 75a . . . 75n. If this net current flow to the voting circuits 75a . . . 75n is positive, a binary one signal will occur at the output gates 26a . . . 26n; if it is negative, a binary zero output signal will occur at the connections 26a . . . 26n. The DACs 70a . . . 73n mimic the paths which interconnect the neurons in a living organism while the voting circuits 75a . . . 75n mimic the neurons and how they fire in response to interconnections of other neurons. The "path reinforcement" of the DACs 70a . . . 73n is determined by the value of the binary number in the DACs up-down counter 67, which is altered by the punish/reward connections 76a . . . 76n. Each row of DACs (for example, 70a . . . 70n and 74a) and its associated voting circuit (75a in the example) has an output (such as 26a); a punish/reward pair (e.g., signals 76a) is associated with each of the rows.

To understand how the circuit 21 operates, let it be assumed that two modes can occur: learning and recognition. First the circuit learns to respond to various patterns of inputs 25a . . . 25n to give the proper active outputs at connections 26a . . . 26n. Later, in a recognition mode of operation, the learned responses are used to identify the input signals 25a . . . 25n; active output signals 26a . . . 26n indicate a recognized pattern of input signals 25a . . . 25n.

In the learning mode, the circuit 21 operates in the following manner. Let it be assumed, for example, that the external source 9 in FIG. 1 is a computer which is capable of applying input patterns 11 to the sensors 10, capable of interpreting the output signals 3 of the entire self-organizing circuit 1 as well as the outputs 26 of each level circuit 21A . . . 21N in FIG. 2 and further, is capable of sending signals to the punish/reward connections 76a . . . 76n in FIG. 7A of each level circuit 21A . . . 21N. During the learning mode, the computer 9 applies different learning experiences or lessons to the input sensors 10, identifies the outputs of the level circuits 21A . . . 21N and alters the binary numbers stored in each DAC 70a . . . 74n in FIG. 7A by sending signals to the punish/reward lines 76a . . . 76n of each level circuit 21A . . . 21N. Learning will usually take place heirarchically; first, lower level circuits such as the level one circuit 21A learn primitive outputs based on information from the preprocessor circuit 20; then higher level circuits such as the level two circuit 21B are "taught"; learning progresses to higher and higher levels until the desired recognition of input patterns 11 is obtained to provide the output signals 3.

In general, the computer 9 "teaches" a level circuit 21A . . . 21N in the following manner. A desired pattern 11 to be learned is applied to the input sensors 10 in FIG. 1 and the outputs 26 of a particular level circuit are monitored by the computer 9. These outputs, i.e., the outputs 26a . . . 26n in FIG. 7A, ultimately represent the input pattern 11 to the sensors 10. If an active signal does not appear at the proper output connection 26a . . . 26n in FIG. 7A, the error tends to be corrected by punishing the particular output 26a . . . 26n which were active; conversely if the desired output is active the particular output 26a . . . 26n is rewarded. Reward is accomplished by the computer applying a reward signal to connection 76a . . . 76n corresponding to the output connection 26a . . . 26n of the appropriate output signal to be rewarded; punishment is accomplished by the computer applying a punish signal to the appropriate connection 76a . . . 76n.

To understand this process, let the input signals at 25a, 25b and 25c correspond respectively to a left diagonal, a right diagonal and a horizontal. The signals 25a, 25b and 25c themselves result from the recognition of the various components due to prior teaching of lower level circuits, not shown in FIG. 7A. When the computer 9 applies a pattern corresponding to the letter "A" to the input sensors 10 in FIG. 1 the input signals 25a, 25b and 25c presumably fire because the capital "A" has components corresponding to a left diagonal, a right diagonal and a horizontal. Initially, the up-down counter 67 in each of the DACs 70a ... 74n has a zero binary number, thus causing no electric current flow from the DACs and no active signals 26a ... 26n.

Let it now be assumed the computer 9 was programmed to allow the first row of DACs 70a ... 74n to correspond to the input pattern 11 for the letter "A". In this case the desired result is for an active signal to appear at the connection 26a. The computer 9 applies a reward signal to the connection 76a, which increases the value of the binary numbers in the counters 67 of each DAC 70a ... 70n which had a corresponding input signal 25a ... 25n—in this case DACs 70a ... 70c have a bit added to their respective counter 67 since active input signals occurred on connections 25a ... 25c. As more and more learning experiences of the letter "A" occurs, the counters of the DACs corresponding to the letter "A" have higher binary numbers and send more current to the voting circuit 75a, causing the voting circuit to fire and giving an output at the connection 26a. On the other hand, the inputs 25a, 25b and 25c may not always be the same during lessons. In the example, some "A's" may not have horizontals; some may have other subcomponents (e.g., the vertical signal at 25n in FIG. 7A). These are rewarded when they occur but presumably most of the correct "A's" contain the signals 25a, 25b and 25c. The DACs 70a, 70b and 70c have the highest binary numbers in their respective counters 67, output the most current and therefore have the most influence on the firing of the voter 75a.

Punishment occurs when an input 11 presented by the computer 9 to the input sensors 10 gives an undesired output signal 26. An undesired output signal 26 is one whereby the teaching computer 9 identified an incorrect active output 26—one which did not correspond to the given input pattern 11. For example, if the letter "V" is input to the sensors 10, a lower level circuit identifies the left and right diagonal as input signals (among others). Thus the inputs correspond to signals 25a and 25b. Assuming that the computer associated output 26b with the pattern for the letter "V", both outputs 26a and 26b may occur. The latter is the "correct" output signal and hence its DACs 71a and 71b have bits added to the binary number in their counters 67, just as in the case for the letter "A" mentioned above. However, the letter "V" is not expected to have a component horizontal, so signal 25c does not fire under most letter "V" lessons and DAC 71c does not have a high count in its binary number stored in counter 67.

While the letter "V" output signal 26b results in rewards to DACs 71a and 71b the computer 9 also punishes other DACs 70a ... 73n whose signals 26 fired but were not supposed to. The punishment is accomplished by reducing the value of the binary numbers in DACs which participated in the erroneous signal. For example, in the case where the circuit was learning the pattern 11 of sensor 10 inputs which represent the letter "V", an output signal 26a for the letter "A" may erroneously fire since two of three important sub-components (the left and right diagonal signals 25a and 25b) are feeding current from DACs 70a and 70b into the voter 75a. By reducing the binary number in DACs 70a and 70b, less current flows into the voter 75a and thus an output is less likely to occur at the connection 26a. As the erroneous output signal 26a occurs during letter "V" lessons it is punished more and more until it gives no further erroneous output at the connection 26a. Essentially, a letter "A" becomes more and more recognized by the horizontal component 25c than does the letter "V": certainly a distinguishing characteristic of an "A" is the horizontal, when compared to a "V". In general, there are many more features or input signals 25 (in FIG. 1) of a letter than just the few mentioned above. Relative positions of components, intersections, lengths of components and so forth are all relevant in distinguishing patterns which represent letters of the alphabet.

The threshold DACs 74a ... 74n are used under certain conditions during teaching mode operation to bias the voltage level of the voters 75a ... 75n (FIG. 7A). Usually, the threshold DACs 74a ... 74n are "sink" DACs which draw current from the input 30a (FIG. 3) of the voters 75a ... 75n. For example, in the case where the DACs 70a ... 73n have only positive binary numbers stored in their respective up-down counters 67 and the supply S is positive only positive currents will output from the DACs 70a ... 73n at the respective connections 64c (FIG. 6A). These positive currents fed to the voter input connections 30a in FIG. 3, must be biased by a negative current; otherwise the outputs of every DAC 70a ... 73n with any binary number in the counters 67 causes the outputs 26a ... 26n to fire. Clearly, the circuits such as 21 would not function as self-learning circuits if virtually any positive number in counters 67 fired their respective outputs 26a ... 26n.

The bias or threshold DACs 74a ... 74n are punished and rewarded just as the DACs 70a ... 73n: by the computer 9 furnishing punish or reward signals on the connections 76a ... 76n. However, the threshold DACs 74a ... 74n are gated by the external gate $G_2$ (signal 67d in FIG. 6A) rather than by the internal gate $G_1$ (signal 64b in FIG. 6A) that controls the DACs 70a ... 73n. The respective external gates 67d in FIG. 6A are signaled by the computer 9 in an appropriate manner to allow the value of the binary number in the counters 67 of the threshold DACs 74a ... 74n in FIG. 7A to approximately negate the effects of the sum of positive binary numbers in DACs 70a ... 73n when the correct response to an input pattern 11 to the sensors 10 is obtained at the output connection 26a ... 26n. In general, $N_t = Kf(\leq N_i)$ where:
  $N_t$: Binary number in threshold DACs 74a ... 74n
  $N_i$: Binary number in each of i DACs 70a ... 73n which result in obtaining a correct output at connections 26a ... 26n
  K: Fractional number For example, in the previous example of teaching a circuit such as the circuit 21 the proper output for an input pattern of the letter "A" input to sensors 10, after, say, one hundred lessons one might expect the binary numbers in the DACs 70a, 70b and 70c in FIG. 7A to have decimal equivalents of, say, fifty, fifty and eighty, respectively. Assuming no other significant features were required to trigger an output response 26a the decimal equivalent of the binary number in the DAC 74a might be approximately one hundred fifty. Since the DAC 74a draws current from the junction 30a (FIG. 3A) of voter 75a while 70a ... 70c add current to the junction 30a, the net current to junction 30a would be proportional to thirty, the difference between the binary number in the DACs 70a ... 70c and the DAC 74a. This current would trigger the voter 75a to give an active output signal 26a. It will be noted, however, than an input pattern representing the letter "V" might only cause the DACs 70a and 70b to output currents proportional to their binary numbers (whose decimal equivalents are fifty and fifty). The net current at the junction 30a of the voter 75a is negative; so no output signal 26a results. Thus, for the special case considered here, the threshold DAC 74a helps distinguish between the letter "A" and the letter "V".

The value of the binary number in the DACs 74a . . . 74n are altered by repeated gating of the appropriate external gates 67d in FIG. 6A. Since the teaching computer 9 actuates the reward and punish signals 76a . . . 76n and also has knowledge of those input signals 25a . . . 25n that are active, memory locations in the computer 9 can be programmed to store the values of the binary numbers which are also stored in the respective counter 67 of the DACs 70a . . . 73n. Gating of the DACs 74a . . . 74n is based on these binary numbers, as suggested above.

The threshold DACs 74a . . . 74n in FIG. 7A are a circuit generalization over self-learning circuits such as the circuits 21 which use positive/negative DACs 70a . . . 73n (in place of the positive current DACs 70a . . . 73n discussed above) as the "weighting" mechanisms for the input signals 25a . . . 25n. Positive/negative DACs can be arranged to accomplish the same function as positive-current DACs 70a . . . 73n combined with the threshold DACs 74a . . . 74n; positive/negative DACs 70a . . . 73n are devices which can output both positive current for positive values of the counter 67 as well as negative currents for negative values of counter 67. It will be observed that the circuit of a positive/negative DAC is similar, but not identical, to that shown in FIG. 6A.

With positive/negative DACs 70a . . . 73n inserted into the circuit 21 in FIG. 7A, the threshold DACs 74a . . . 74n may not be required. Rewarding is accomplished, as before, by adding bits to the binary number stored in counter 67 of the DAC; punishment is done by substracting binary bits from the numbers stored in counter 67. The current output of one of the DACs 70a . . . 73n will be positive if the particular DAC has been rewarded more than punished (i.e., that a net positive binary number is maintained in the counter 67); the current will be negative if the DAC has been punished more than rewarded (a net negative number stored in counter 67). A positive current from a particular DAC will tend to fire the associated voter (i.e., the voter 32 in FIG. 3 or the appropriate voter 75a . . . 75n in FIG. 7A); a negative current will tend to inhibit the associated voter from firing. Punishment and reward are handled, as before, by the computer 9 which activates the punish or reward lines 76a . . . 76n as a function of the "correctness" of the output active signals 26a . . . 26n when enabled by signals 25a . . . 25n to gate $G_1$ of the DAC. Positive/negative DACs used as DACs 70a . . . 73n probably mimic the response of brain neurons more closely than do positive DACs such as the DAC 60 in FIG. 6A and 6B combined with threshold DACs 74a . . . 74n. However, the positive/negative DAC method is generally more expensive to implement than the positive only DAC method. Both are valid methods of producing self-organizing circuits. In the discussion which follows, positive/negative DACs (or their equivalents) will be used to discuss implementations of various designs of self-organizing circuits. This is done as a simplification since the threshold DACs may even be required in certain circuits using positive/negative DACs.

Figure 7B:
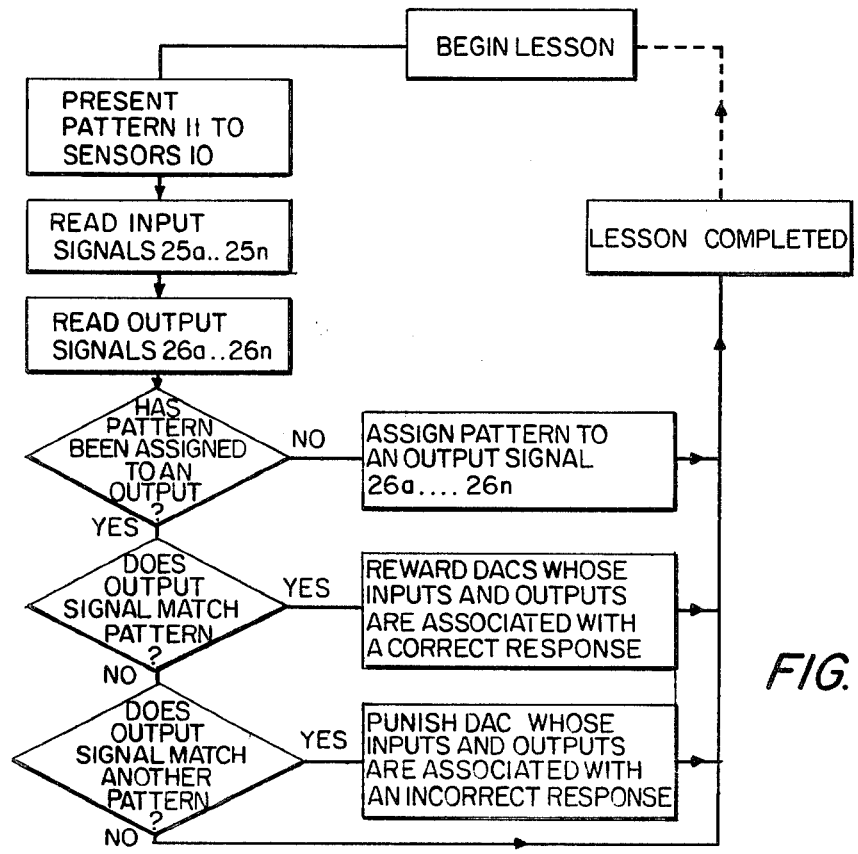
FIG. 7B is a flow chart for the computer of FIG. 1.

The operation sequence of the computer 9 or some other external source can be summarized by the flow chart shown in FIG. 7B. Note in this regard that the computer 9 (or other external source) associated with most self-organizing circuits 21 is used to teach the circuits and is not used for the circuit's operation. The use of the computer 9 rather than some other external source (for example, a human operator) is one of convenience only. Teaching with some other external source is identical to teaching with a computer 9, though perhaps slower. The innovation of the present invention lies in the structure of the self-organizing circuits such as circuit 21 in FIG. 7A and the method by which the circuit organizes itself, not in the use of a computer 9 which is merely a convenient and speedy means of teaching the self-organizing circuit.

FIG. 7B indicates that the first task of the computer 9 or other external source is to present patterns 11 to be recognized to the sensors 10. For example, a human operator may write a pattern 11 representing the letter "A" such that an optical system associated with the sensors causes digital variation in the sensor outputs as discussed earlier. Next, the active input signals 25a . . . 25n and output signals 26a . . . 26n of a particular level circuit 21 are read as indicated by the second and third blocks of the flow chart. The next operation in a "lesson" is to assign or associate an active output signal 26a . . . 26n with the particular pattern 11 to be learned, if this has not already been done in a previous lesson.

The final two operations concern reward and punishment. If the output signal 26a . . . 26n matches the assigned pattern, the DACs 70a . . . 73n associated with both the input and output signals are rewarded by increasing the value of the binary number stored in their counters 67 (for illustration, positive/negative DACs 70a . . . 73n are assumed). If the output signal 26a . . . 26n does not match the assigned pattern 11, the DACs 70a . . . 73n associated with both input and output signals are punished by reducing the value of the binary number stored in their counters 67. At either of these decision points the lesson is completely by altering the binary number stored in the counters 67 of the appropriate DACs by triggering either the reward or punish lines 76a . . . 76n.

The flow chart and reward/punishment procedure shown in FIG. 7A is not the only procedure useful in connection with the self-organizing circuits 21, but represents one of several possible procedures, as will be discussed shortly, other procedures represent simple changes in the method of altering counters 67 of DACs 70a . . . 74n while still others represent slight variations in the circuits as well. For example, a self-organizing circuit such as the circuit 21 may have its counters 67 altered in the following manner: each output 26a . . . 26n which fired increases the binary numbers in those DACs 70a . . . 73n which already contain positive binary numbers but reduces the binary numbers in those DACs 70a . . . 73n which already contain negative binary numbers. This learning strategy—not based on reward or punish signals—is useful in stabilizing a particular pattern 11 to a particular output 26a . . . 26n after initial inhibitory or excitatory characteristics (minus or plus binary numbers) has been established through punish and reward signals 76a . . . 76n. In this case, only the method for altering binary numbers is changed, not the circuit itself. Another way in which the learning strategy is changed is by altering the circuit itself. Although often the same effect can be accomplished by modifying the rule for altering binary numbers, both methods are valid for teaching self-organizing circuits. The discussion which follows considers a few ways in which the circuit itself can be changed to improve self-organizing.

Certain self-organizing circuits may require outputs $26a \ldots 26n$ to feed directly back to inputs $25a \ldots 25n$. These feedback signals, discussed previously in regard to neural circuitry, may aid in distinguishing between various patterns. For example, an output signal specifying the capital letter "A" may be required in recognizing the capital letter "V": although an "A" pattern has some of the components of the "V" pattern, the pattern cannot simultaneously be both. Thus a characteristic of the "A" pattern is that it is not "V"; a characteristic of the "V" pattern is that it is not "A". If the output signal representing pattern "A" is signal $26a$, when that signal is used as an input signal $25a \ldots 25n$ of the circuit 21, it tends to have a negative weighting effect in the case where, say, positive/negative DACs $70a \ldots 73n$ are used to provide the current inputs to voters $75a \ldots 75n$. As learning progresses, each correct pattern "A" which was recognized acts to inhibit the pattern "V" output from occurring since the computer 9 punishes the input signal (i.e., adds negative binary numbers to the counter 67 associated with the appropriate DAC $70a \ldots 73n$) if the signal for pattern "V" occurs simultaneously with that for pattern "A".

Alternatively, the computer 9 may in some self-organizing circuits such as circuit 21 punish all DACs $70a \ldots 73n$ for the ones (e.g., $70a \ldots 70n$) which the computer 9 had identified with the pattern "A" output signal $26a$. The effect is the same—one and only one of the signals $26a \ldots 26n$ tends to fire during any particular recognition cycle.

In still other self-organizing circuits 21 the input signals $25a \ldots 25n$ themselves may be required to be negated. For example, in recognizing the pattern for the letter "O", an important criterion may be the absence of any straight lines such as diagonals, horizontals or verticals. Thus an active signal representing "not vertical" or "not horizontal" may be as useful in recognition tasks as the signals representing "vertical" or "horizontal". NOT signals are simply inversions of the signals $25a \ldots$ or $26a \ldots$ and can be manifested by inverters such as shown in FIG. 4A. Inverters convert an active signal to an inactive one and vice-versa. A self-organizing circuit such as circuit 21 which may require negation of this sort has an inverter 43 connected between each of the inputs 25 and 26 (FIG. 2) and the next higher level circuit. For example, the signal representing a "vertical" component is transmitted both to the circuit 21 directly as an input $25a \ldots 25n$ and also through an inverter 43 and then to the circuit 21 as an input $25a \ldots 25n$ that represented "not vertical". In living organisms, this negation function is accomplished by chemical gates which can inhibit the neuron from firing. Presumably, an input signal from one neuron is transmitted to another neuron as both an excitory and an inhibitory synapse; one or the other synapse is "punished" and thus has little influence on the neurons "voting."

The above discussion deals with the learning mode of operation of self-organizing circuits such as the circuit 21. The recognition mode occurs after the self-learning circuits $21A \ldots 21N$ have been taught through many learning trials of different input patterns 11 to the sensor 10 by the computer 9. The output signals 26 may be the final step in recognizing a pattern 11 or may be an intermediate step to more complicated patterns of other higher level circuits such as circuits $21B \ldots 21N$. In general, learning begins at the lowest levels so that such components as diagonals or curves are learned before letters or words at a higher level. Children learn to read in a similar fashion—few recognize words before they first recognize letters. In fact, certain learning disabilities such as dyslexia or "specific language disfunction" are thought to occur, at least in part, because higher levels of neurons were "learned" before lower levels were adequately "learned." The neural connections are poorly organized resulting in poor pattern recognition at the higher levels.

The learning mode as discussed so far has been separated in time from the recognition mode. First, learning occurs and then, later, the taught circuit $21A \ldots$ can recognize patterns. However, during learning the taught circuit is also recognizing patterns on which it signals recognition by output signals at connections $26a \ldots 26n$. Hence, recognition and teaching by the external source or computer 9 are actually occurring simultaneously: learning mode and recognition mode can occur simultaneously if the computer 9 is made to punish or reward the circuits such as the circuit 21 according to the "correctness" of the response via signals $26a \ldots 26n$.

Ideally, pattern recognition which occurs at higher levels should influence the learning process at lower levels. For example let it be supposed that the positive/negative DAC method is used in the level one circuit 21A of FIG. 2 for recognition of letter components such as left diagonal, right diagonal, horizontal and so forth. Let it be supposed, too, that in a level two self-organizing circuit 21B, the same method is used to recognize patterns of letters based on the outputs of the level one circuit 21A In the learning of patterns 11 by the first circuit 21A, punish or reward signals $76a \ldots 76n$ alter the binary numbers in DACs $70a \ldots 73n$ as earlier described in order to identify output signals $26a \ldots 26n$ associated with component patterns of diagonals, horizontals and so forth. However, in some self-organizing circuits 1 (FIG. 1), learning of component patterns 11 by the first circuit 21A may also occur simultaneously with learning of patterns of letters by the second level circuit 21B.

To accomplish this function in electronic circuitry the punish or reward signals (signals 5 and 6 in FIG. 1) can be transmitted simultaneously to all DACs $70a \ldots 73n$ rather than by separate punish-reward connections $76a \ldots 76n$ as in FIG. 7A. In this alternative circuit, the existing punish/reward signals $76a \ldots 76n$ are connected directly to the output signals $26a \ldots 26n$ (i.e., 26a connects to 76a, 26b to 76b and so forth). In addition, each DAC $70a \ldots 73n$ combines the "universal" punish-reward signals 5 and 6 from the computer 9 with the output signals $26a \ldots 26n$ to alter the binary number stored in the respective counter 67 of the DAC $70a \ldots 73n$. In one simple method of accomplishing the combining, a simple AND combination (both inputs present to get a signal) of the "universal" punish/reward signals 5 and 6 and the output signals $26a \ldots 26n$ are used to alter the binary numbers.

In operation, a correctly recognized pattern 11 (as presented to the sensors 10 by the computer 9) causes the computer to transmit a reward signal 5 to the self-organizing circuit 1. The reward signal 5 (FIG. 1) combined with an active output signal $26a \ldots 26n$ in an AND combination adds binary numbers to the counters 67 in the DACs 70a ... 73n; the punish signal 6 (FIG. 1) combined with an active output signal 26a ... 26n (FIG. 7A) in an AND combination subtracts binary numbers from the counters 67. As before, the "enabling" signal 64c to the DAC is transmitted to the DACs 70a ... 73n via the input signals 25a ... 25n.

In the present example, learning of "letter" patterns 11 by circuit 21B is accompanied by punish signal 6 and reward signal 5 depending on whether the learning was correct or incorrect. Since these same punish and reward signals are also transmitted to circuit 21A learning will occur on this circuit as well: binary numbers will be altered in response to correct or incorrect answers. Hence, a "diagonal" component signal on first circuit 21A is rewarded if it helped to cause a correct letter "A" pattern be recognized by the circuit 21B. In general, any DAC in the circuit 1 (FIG. 1) which contributes to a correct answer is rewarded; a DAC that contributes to a wrong answer is punished.

In living organisms, the present inventor believes such a mechanism is responsible for at least some learning. Neurotransmitters which are activated by pain are among the punish signals transmitted to all neurons; neurotransmitters which are activated by pleasure are among the reward signals. Neurons participating in a painful experience lead to less influence by the synapses involved; neurons participating in a pleasurable experience have their excitor synapses enhanced.

Some circuits which have "universal" punish/reward signals 6 and 5 (FIG. 1) can eliminate the need for learning experiences by a lower level circuit (e.g., level circuit 21A used in the previous example). The issue is concerned with "naming": associating a particular output 26a ... 26n with a named or known pattern 11. For the circuits 21A ... discussed so far, all outputs 26a ... 26n are known or identified prior to learning. If output 26a, for example, is associated with the pattern 11 for a left diagonal, the punish/reward connections 76a are used by the computer 1 to transmit the proper punish/reward signal depending on the correctness of the signal 26a response to a left diagonal pattern 11. Each pattern 11 shown to sensors 10 is associated with a particular output 26a ... 26n; the forming of these associations is the process of "naming."

While naming of some outputs ay be quite important, for other outputs it is not. For instance, a circuit 1 (FIG. 1) whose task was to optically read handwriting would be very concerned which letter patterns 11 were associated with which letters, although the outputs 26a ... 26n associated with the components such as left diagonals, verticals or horizontals might not be important at all. For situations such as these, the naming process can occur randomly. One way to accomplish random naming is to load the counters 67 of DACs 70a ... 73n (FIG. 7A) with small, but random, binary numbers prior to learning. During initial lessons all outputs either fire or don't fire based solely on the sign (positive or negative) of the summation of random numbers stored in their DACs 70a ... 73n. Those outputs 26a ... 26n which fired are rewarded or punished by adding or subtracting binary numbers from the counters of DACs 70a ... 73n which had inputs 25a ... 25n; reward and punishment signals are based on correctness of higher level outputs 26a ... 26n of a level circuit 21A ... 21N. Some circuits 21A ... 21N may require feedback signals from output to input, as discussed earlier, to insure that only one of the outputs 26a ... 26n of the level circuit or concern fired.

As learning progressed, some output signal 26a ... 26n tends to become associated with an intermediate component. Exactly which one it was is not important since these intermediate outputs 26a ... 26n are transmitted to the next higher level circuit. For example, if the level one circuit 21A is to have outputs 26a ... 26n which represented components such as diagonals, horizontals and so forth of letters whose outputs 26a ... 26n are in the level two circuit 21B, the DACs 70a ... 7n of the first circuit 21A would be loaded with small random binary numbers. Input signals 25a ... 25n of the first circuit 21A may come from sensors 10 but processed by preprocessor circuit 20. These inputs 25a ... 25n would activate certain columns of the DACs 70a ... 73n in FIG. 7A, for instance, the first three columns of DACs. Some of DACs 70a ... 73n, based on the random numbers in their counters 67, would output enough current to the voters 75a ... 75n to cause the voters to fire. If at this point, the output signal 26a ... 26n of the level two circuit 21B were correct, the computer 9 would send a reward signal 5 to the circuit 21A and also to the circuit 21B causing DACs 70a ... 73n (associated with active signals 26a ... 26n and active input signals 25a ... 25n) to have the binary number in their counters 67 incremented; if the signal were incorrect, the counters 67 would be decremented. In particular, the DACs 70a ... 73n in the first circuit 21A would be incremented or decremented. As more and more lessons occurred for various patterns 11 of block letters, certain intermediate components would become associated with particular outputs 26a ... 26n of the level one circuit 21A. However, which outputs become associated with which intermediate component patterns 11 would not be known, a priori—before learning commenced. Hence, an output 26a might become associated with a diagonal, with a horizontal or with some other component pattern 11 purely at random; "naming" is not always necessary.

It will be useful to consider implementation of a circuit 21 by comparison to common techniques used in microcircuit fabrication. As manufacturing techniques have improved, more and more circuits can be packed into a chip, a small thin slice of silicon. Each of these circuits must necessarily be perfect; all components must work in the prescribed manner or the entire chip must be discarded. In some large circuits, perhaps only 10% of the chips are good in all respects. The other 90% must be discarded. This percentage, called "yield", decreases as fabricators try to pack more circuits onto a single chip. In some cases of chips with very large circuits, extra sub-circuits (i.e., redundant sub-circuits) are added to the chip to be "patched in" later by cutting connections on the chip, thus replacing a defective sub-circuit which would otherwise make the entire chip defective.

The situation is not dissimilar to gene replication in living organisms. As the total amount of gene information in an organism's cells increased through history (as the organisms which the gene represented became more complicated), the possibility of no imperfections in each cell's genes diminished. In essence, when nature tried to pack more and more bits of genetic information into a cell, the "yield" went down. To improve the yield, over time certain enzyme molecules developed which could repair some structural damage in genes, just as microelectronic chips can be repaired to some extent after they are fabricated. (See, "The Dragons of Eden," p. 26, C. Sagan.)

Significantly, storing information in "exact replica" form associated with the coding of information in genes became very difficult when the total amount of information got a little above a billion bits. Nature had a better way to store information that was not so sensitive to slight imperfections: self-organizing neural circuits. The basic structure is such that if errors in one neuron occurs, another takes over for it; redundancy is inherent throughout. If neurons are injured, such that they can no longer pass on the proper information, other neurons self-organize to give the same functional output. No longer must the information of each circuit be exact: the neuron responds to other neurons in a statistical way such that the output of any particular neuron has little importance. A price is paid for this flexibility: self-organizing must be done by each and every organism, not "preprogrammed" as genes could be. The self-organizing takes a long time. Higher level organisms like humans and other mammals require several months or years of learning to be self-sufficient. But the price is worth it; thousands of times more information can be stored in a human brain that is stored in a human's genes.

In relation to microcircuit fabrication, loosening the "yield constraint" means that more complicated circuits can be fabricated without requiring that each be perfect. For example, masking techniques are such that as more than ten or twenty masks are laid one upon the other (to form conducting wires, transistors or what have you), yield is substantially reduced. With self-organizing circuits such as the circuit 21 in FIG. 7A, more layers can be stacked one upon the other with little reduction in yield. A voter $75a \ldots 75n$ which malfunctions can be replaced by another voter during the learning mode when the teaching computer 9 discovers the voter is not responding to learning. Even a DAC $70a \ldots 73n$ will not be missed as other paths weight themselves more heavily in order to give the proper output despite a nonfunctioning subcircuit such as a DAC.

Earlier, a preprocessor circuit 20 in FIG. 2 was discussed in regard to inputting the proper signals 25 into the level one circuits 21A. To understand how the self-organizing circuits 21A . . . 21N actually performs on raw input data signals 2 from the sensors 10, an example of a preprocessor circuit labeled 120 for a specialized application is discussed below with reference to FIG. 8. The particular application used is that of an array of optical sensors 10 which perform the function of the first few layers of the retina in a human eye. Other embodiments consider other preprocessor circuits 20 for other specialized applications such as the recognition of speech patterns or the recognition of sensor (i.e., touch) patterns. The circuit 120 discussed below is meant only to illustrate how one such preprocessing circuit operates in conjunction with the sensors 10 and the self-organizing level circuit 21.

Figure 8:
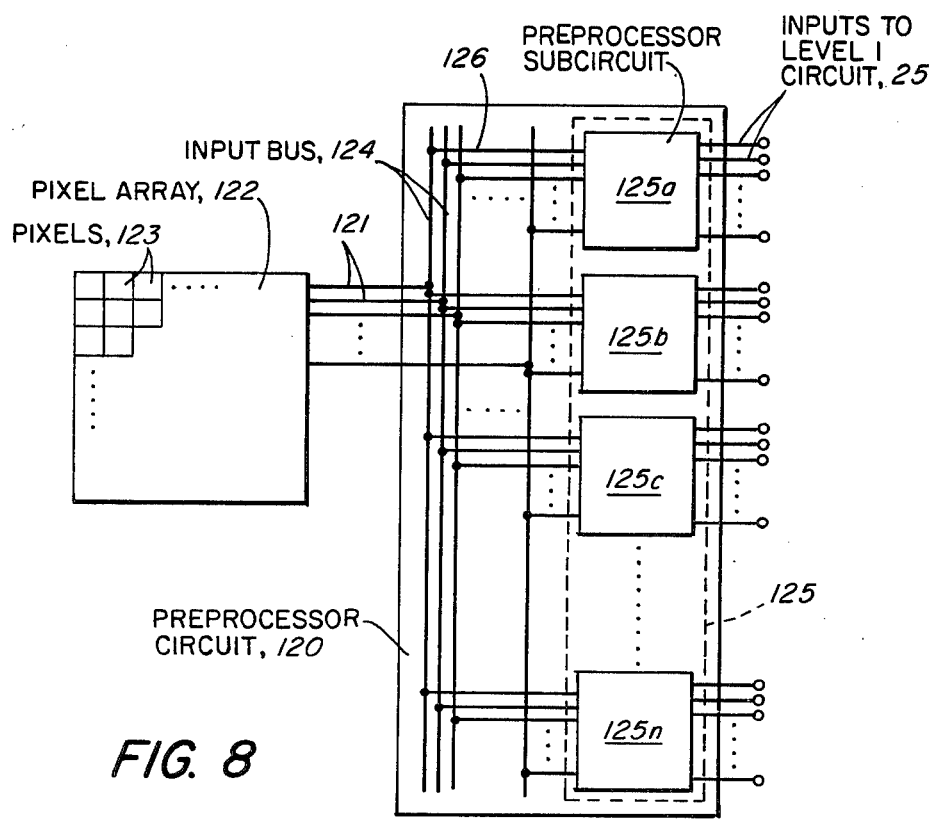
FIG. 8 shows diagrammatically a preprocessor circuit in combination with an array of optical sensors.

As shown in FIG. 8, the optical preprocessor circuit 120 receives inputs 121 from an array 122 of optical sensor pixels 123. Each signal 121 from the pixel array 122 is separately connected to each pixel element 123. A pixel element 123 can be, for example, photovoltaic sensors whose voltage output signals 121 relate to the amount of light impinging on each sensor. Teaching or recognition patterns 11 can be introduced to the pixels 123 by optically casting a shadow of the desired pattern 11 on the array 122. The actual method used to obtain voltage output signals 121 from the array 122 is not particularly of concern; of concern is that the desired geometric pattern 11 to be recognized by the circuit 1 in FIGS. 1 and 2 is partitioned into numerous sensor inputs each of which represents a portion of the pattern. The pixels 123 need not be of the square array shown in FIG. 8. They can be a radial or even random; they need not be area-sensitive sensors (they can for example, sense the pattern 11 crossing edges of the square pixels 123 shown); and they need not even be optical input sensors (an array of switches 123 activated by an embossed pattern 11 is adequate). However, each pixel 123, when activated, is represented by an input signal 121. Usually, the input signals 121 are binary: they are active or they are not. Depending on the type of sensors employed, an analog voltage may be converted to a binary one when the analog signal is greater than some voltage threshold.

The input signals 121 to the preprocessor circuit 120 connect directly to an input bus 124, such that all the signals 121 are available to various preprocessor subcircuits consisting of sub-circuits $125a, 125b, 125c \ldots 125n$ via connections 126. The task of the circuits $125a \ldots 125n$ is to convert the raw sensor data 121 into useful output information suitable for processing by circuit 21A via connections 25. The task of each of the primitive circuits $125a \ldots 125n$ is to represent different "features" or subcomponents; for an optical pattern 11 the features may be such patterns as a vertical line, a horizontal line, a left facing diagonal or a right facing diagonal. The circuits $125a \ldots 125n$ are part of the preprocessor circuit 120 because the information is first processed before learning occurs—the circuits $125a \ldots 125n$ do not have learning capabilities such as the circuits 21A . . . in FIG. 2.

Thus, for example, the task of the circuit $125a$ may be to detect short horizontal lines optically masked unto the pixel array 122 as suggested earlier. One method of detecting lines such as a horizontal, a vertical or a diagonal is to use "nearest neighbor rules" of the pixel elements 123. If any particular pixel has an active output and its nearest neighbor horizontally also has an active output, then an active signal appears at one of the connections 25 of the circuit $125a$.

Figure 9:
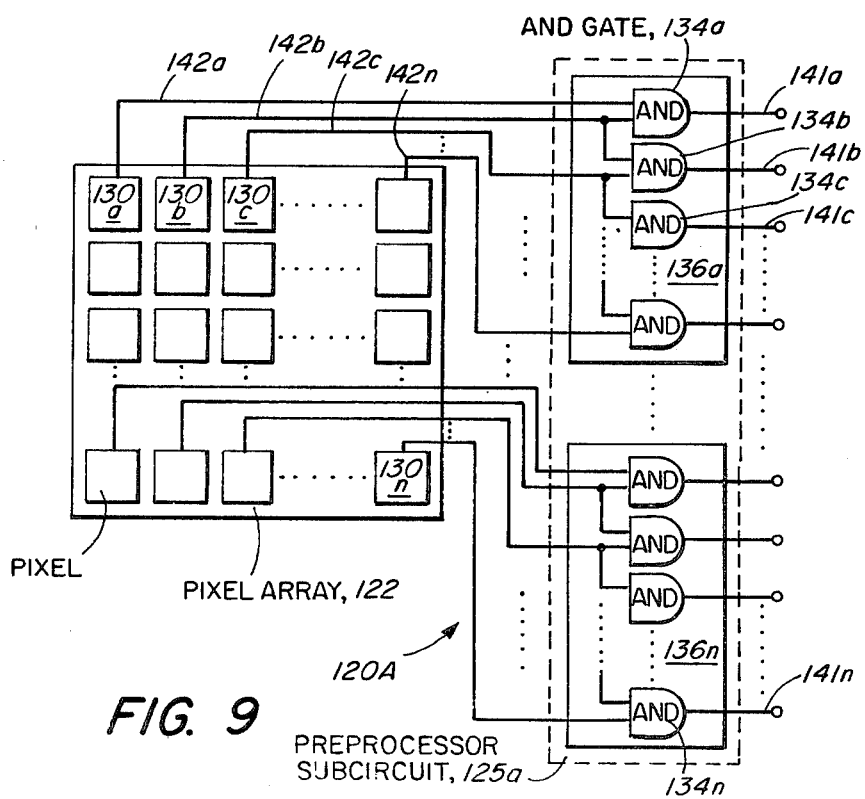
FIG. 9 shows diagrammatically and with some schematic detail one form the circuit of FIG. 8 can take.

FIG. 9 shows how this can be accomplished with standard electronic components for the special case of a horizontal line producing a number of "nearest neighbor" interactions between pixels 123 in the array 122. The pixels, marked $130a \ldots 130n$ in FIG. 9, are connected such that each set of two adjacent pixels is connected to AND-gates $134a \ldots 134n$ of a subcircuit $136a \ldots 136n$ in a preprocessor sub-circuit $125a$. In this example, the pixels $130a$ and $130b$ are both connected to the AND-gate $134a$; the pixels $130b$ and $130c$ are both connected to the AND-gate $134b$. Each row of pixels $130a \ldots 130n$ is connected to a separate subcircuit $136a \ldots 136n$ of AND-gates $134a \ldots 134n$. In FIG. 9 the top row of pixels $130a, 130b, 130c \ldots$ is connected to the gating subcircuit $136a$; the next to the top row is connected to the gating subcircuit $136b$ (not shown) and finally the bottom row of pixels is connected to AND-gates of the gating subcircuit $136n$. In every case, two pixels $130a \ldots 130n$ horizontally adjacent to each other are connected to an AND-gate $134a \ldots 134n$. For example, the line $142b$ connected from pixel $130b$ is routed to both the AND-gate $134a$ and $134b$. Thus, the information from the pixel $130b$ is combined with information from the pixels $130a$ and $130c$—the pixels on each side of it—to give an output at connections $141a$ and $141b$, respectively.

The purpose of the preprocessor subcircuit 125a in FIG. 9 is to identify two-pixel long horizontal lines. If any two horizontally adjacent pixels, such as the pixels 130b and 130c, both have an output, then the output connection 141b will also have an output. Similarly, any other horizontally two adjacent pixels will also give an output at the connections 141a ... 141n. However, only horizontally adjacent pixels will give active outputs since AND-gates give active outputs only if all inputs are active. For example, if pixels 130a and 130c are active (representing an optical pattern 11 imposed on these pixels), connections 141a ... 141n remain inactive because these two pixels are not horizontally adjacent. The information available at the connections 141a ... 141n is much more useful to a learning circuit 21A since much of the organization of pixel output is accomplished by the preprocessor circuit 120 prior to any learning. For example, any output at 141a ... 141n means that two-pixel long horizontal lines are already identified—both with regard to existence as well as to location (i.e., an output at the connection 141a means a two-pixel horizontal line is identified in the upper left of the pixel array, while an output at the connection 141n means one is identified in the lower right of the array: position or location is determined by which output connection 141a ... 141n has an output voltage.

Figure 10A:
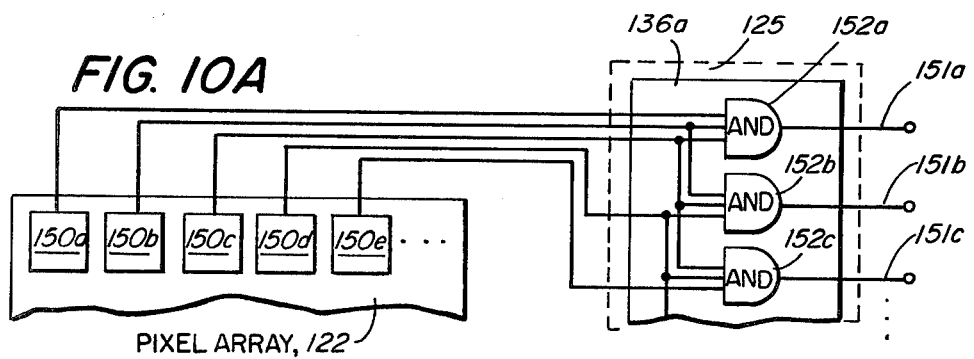
FIGS. 10A, 10B, 10C and 11 are diagrammatic representations of modifications of the circuit in FIG. 9.

Of course, the circuit 125a in FIG. 8 considers only adjacent horizontal pixels. Other preprocessor sub-circuits 125a ... (hereinafter the label 125 generally designates any preprocessor sub-circuit of a preprocessor circuit 120), may identify longer lines seen by the pixels, by AND-gating together more adjacent pixels than simply those which are side by side. For example, each set of three pixels in a row may be connected to a single AND-gate to give three-pixel long horizontal line indications, as shown in FIG. 10A. Here pixels forming three-in-a-row combinations are all connected to the same AND-gate: pixels 150a, 150b and 150c are all connected to an AND-gate 152a; any pattern 11 causing these pixels to output identifies a three-pixel long horizontal line by an output at the connection marked 151a. The output will occur only if all three pixels—not two, not one—have outputs. In a similar manner, other preprocessor subcircuits 125 can identify and locate horizontal lines of any length simply by including more adjacent pixels connected to each AND-gate. It will be noted that a learning circuit 21A probably has all inputs available to it (those representing two, three, four or more pixels in a row) to most easily learn appropriate patterns.

Figure 10B:
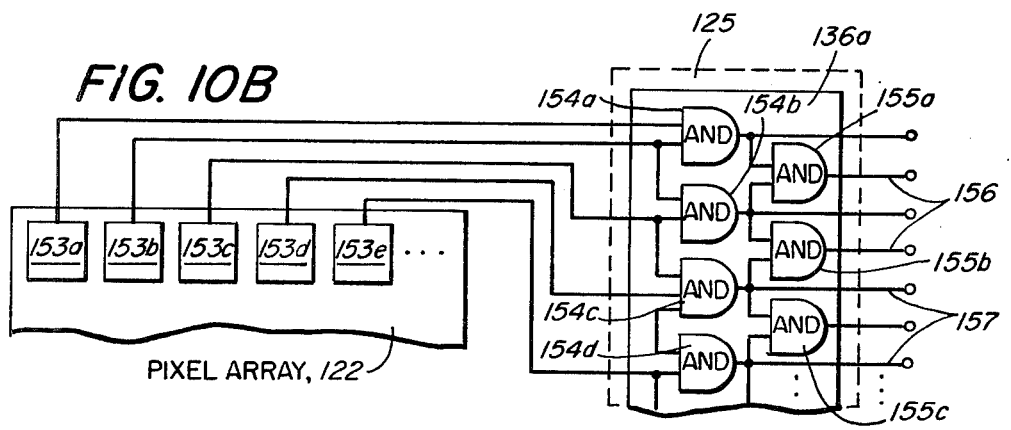

Another method by which a preprocessor circuit 120 can signify length of line is by paralleling the outputs of shorter line-length circuits. As shown in FIG. 10B, four-pixel long horizontal lines can be identified and located by combining the outputs of the two-pixel long horizontal lines. Each of the pixels shown at 153a ... is connected to an AND-gate 154a ... in adjacent pairs as was discussed earlier with regard to FIG. 9. In FIG. 10B, however, the AND-gates 154a ... themselves are connected in adjacent pairs to AND-gates 155a ... 155n. Thus connections 157 will have output signals if any adjacent pair of pixels is activated and connections 156 will have outputs if any pair of pixel pairs 153a ... is activated; connections 156 indicate any four pixels in a row which are activated. The process can be extended (for example, by combining pairs of outputs 156, eight activated pixels in a row can be identified) or combined with the process described earlier with identifying groups of three activated pixels in a row (as discussed in relation to FIG. 10A). Through these techniques, output connections can be used to identify any desired number of activated pixels in a row: two, three, or four as just described, but also more than four.

So far the preprocessor circuits have been described only with regard to identifying horizontal lines of certain pixel length. In general, the pixels can be in any direction: diagonals, verticals as well as horizontals. Diagonals of various pixel length require that adjacent pixels on the diagonal be connected to AND-gates in a similar manner as adjacent pixels on the horizontal are connected to AND-gates 134a ... 134n in FIG. 9. Longer lengths than two-in-a-row are accomplished as discussed for horizontals in FIGS. 10A and 10B.

Figure 10C:
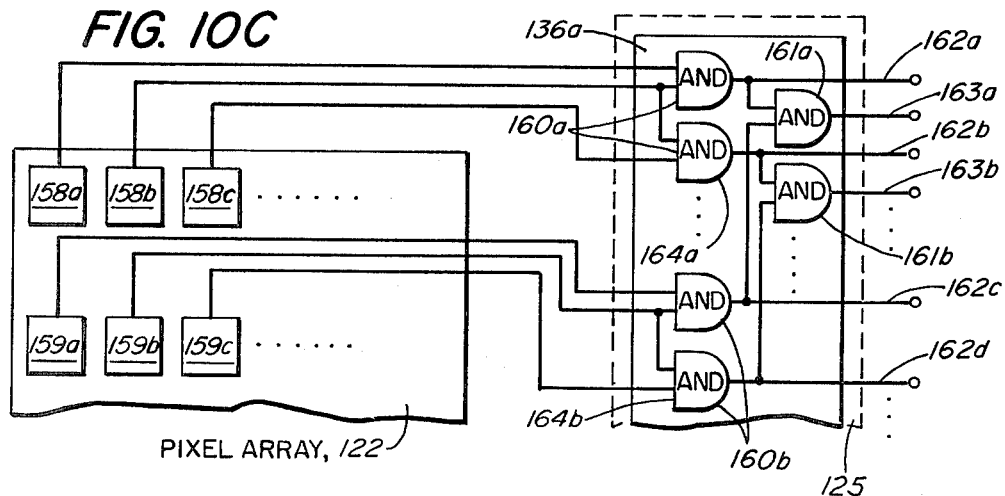

Other features are also possible. Intersections are sometimes characterized by several pixels in a small area being activated: for example, a group of four pixels arranged in a square. These can be identified by AND combinations of adjacent horizontal pairs as shown in FIG. 10C. Pixels 158a ... 158n, when activated, identify adjacent horizontal pixels through the use of AND-gates 160a (as previously shown in FIG. 9). Similarly, pixels 159a ... 159n, when activated, identify adjacent horizontal pixels in an adjacent row through AND-gates 160b. The combination of both an activated pixel pair in one row and an activated pair in another row, above or below, will cause an output signal from AND-gates, 161a ... which is made available to self-organizing circuits through connections 163a .... For instance, if an intersection was to be identified by four pixels in a "square" pattern simultaneously being activated, an output should result at connections 163a .... In particular, let the "square" pattern be composed of pixels 158b, 158c of the first row in FIG. 10C and also pixels 159b, 159c of the second row. The AND-gates labeled 164a and 164b are activated by simultaneous signals respectively from the pixel pair 158b and 158c and pixel pair 159b and 159c. In addition, the AND-gate 161b fires since the AND-gates respond to simultaneous inputs from both of the AND-gates 164a and 164b; the output of the AND-gate 161b is available to self-organizing circuit 21A at the connection 163b. It will be observed that a simple adjacent pair combinations of pixels is also available at connections 162a ....

Preprocessor circuits, like the circuit 120 show how different lengths of activated pixels in different directions can be properly identified for use in self-organizing circuits 21A. However, these identifications specify two characteristics: length, and location. In some situations, more useful information can be passed on to the self-organizing circuit 21A if only the length and not the location is specified. For example, some letters of the block alphabet (which may be used as patterns 11 to activate the pixel array) may be identified more readily by detecting simply *whether* a certain feature exists in addition to where it is located. If the pixel array is activated by a geometric pattern 11 representing either a "E" or an "F", the presence or absence of a horizontal is crucial. Other preprocessor sub-circuits 125 can detect the presence (or in some cases the number) of features fed to self-organizing circuit 21A.

Figure 11:
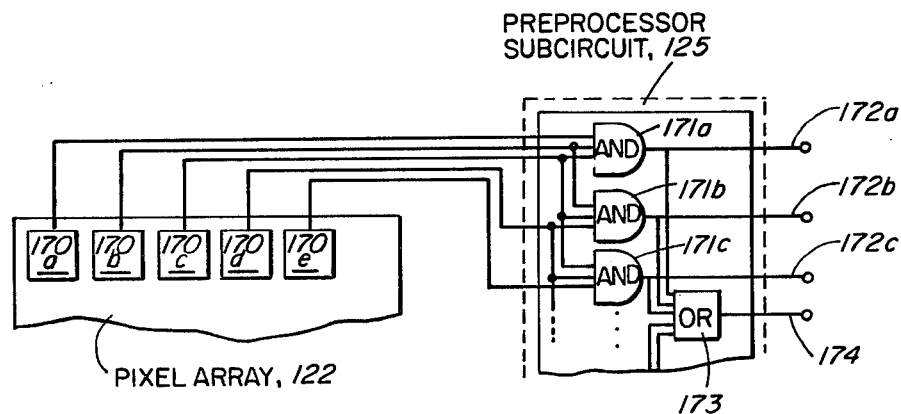

There is shown in FIG. 11 one such possible circuit. AND-gate outputs from a circuit such as was described with reference to FIG. 10A are used in FIG. 11 as the inputs to OR-gates. OR-gates function such that they will fire if any input is present. In FIG. 11, any horizontal set of pixels 170a ... that is three pixels long will fire AND-gates 171a . . . . An OR-gate 173 will fire if any of the AND gates 171a . . . fires. The output of the OR-gate 173 is available to the self-organizing circuit 21A through a connection 174 to provide an indication that a three-long pixel array exists somewhere in the row of pixels. More complicated OR-gating may identify other features such as a diagonal somewhere on the left half of the array, or a two-long horizontal anywhere on the array, or an intersection near the middle of the array. The outputs from OR-gates such as the gate 173 are important because they are not so location specific as the AND-gate (such as the gates 171 . . . ) outputs. After all, a child can recognize the letter "A" no matter where it is located on a page; it is the "connectedness" which identifies letters: right-facing diagonal connected to a horizontal connected to a left-facing diagonal. The OR-gate outputs can identify this connectedness by establishing the general locations of various primitive components with respect to each other.

OR-gates can also be used to reduce the "size" dependency of different patterns. A block letter "A" should be recognized as such regardless of its size: a big capital "A" should be as readily identified as a small capital "A". Of course there are size limitations of the pixel array, but within those bounds size ought not be a major influence. Once the "connectedness" is determined by OR-gate outputs (as suggested above), the size factor of each sub-feature is eliminated. For example, a capital "A" becomes recognized by the recipe: a right diagonal next to a left diagonal with an intersection on their upper end separated by a horizontal. The same recipe is valid regardless of the size of the capital "A". Techniques such as sizing are common in current image processing methods and these methods may also be used for preprocessing; the exact nature of the preprocessing is important only in that it can simplify the task of the self-organizing circuit.

Static preprocessor circuits such as circuit 120 have been described; another variety are time-varying or dynamic preprocessor circuits. Time-varying preprocessor circuits 20 are those which have input patterns 11 (FIG. 1) which are time-varying. An example is a self-organizing circuit 1 designed to recognize speech patterns, say, from a human operator speaking into a microphone. The sensors 10 may be a microphone connected to band-pass filters such that the input signals 2 to the self-organizing circuit 1 in FIG. 1 are digital signals specifying whether the input speech pattern has frequency content of one or more of the filter frequency bands (see Scientific American, "Speech Recognition By Computer", April 1981).

Figure 18:
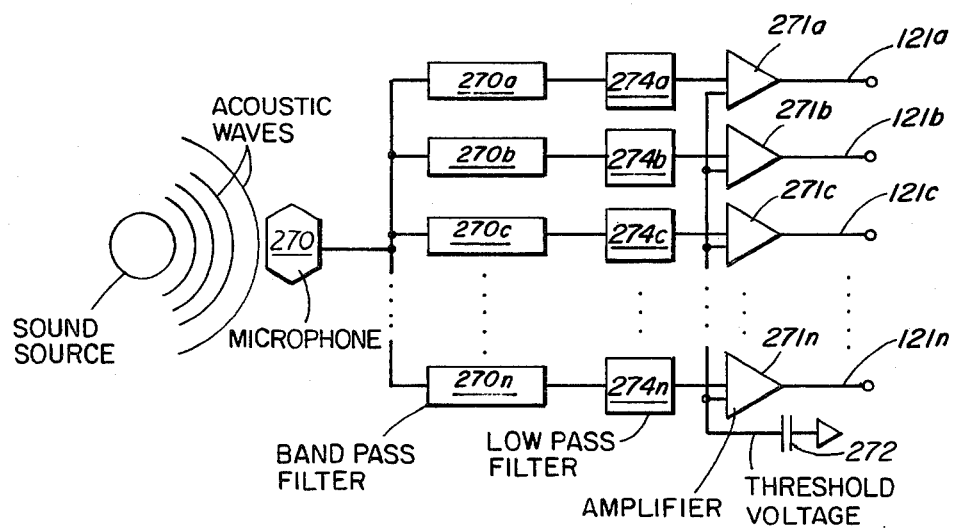
FIG. 18 shows diagrammatically a circuit that receives time-varying information (i.e., acoustic energy) which is acted upon prior to being introduced to the self-organizing circuit of the present invention.

FIG. 18 shows a simple circuit which will convert an input speech pattern 11 into digital signals suitable for input to preprocessor circuits 20 (FIG. 2). The sound source (for example a human whose speech patterns cause a microphone 270 to send an analog electrical signal via connection 273 to each of several band-pass filters 270a . . . 270n). If the speech pattern 11 has frequency content corresponding to the pass band frequency of the band-pass filter 270a . . . 270n, an analog electric signal at that frequency will be transmitted to low-pass filters 274a . . . 274n. The low-pass filters 274a . . . include rectifying, integration and decay functions such that the output electrical signal of the filters is a slowly time-varying analog signal indicating the presence or absence of frequency content at that particular frequency. This analog signal is converted to a digital signal by high gain amplifiers 271a . . . 271n with threshold capacitor 272 (similar to those used in the circuit 32 (FIG. 3)); the signal output at connections 121a . . . 121n is a digital signal which is active only if the sound source has a certain amplitude of frequency content associated with a particular band pass filter 270a . . . 270n. That such crude measurements of speech patterns can be used to identify speech has been demonstrated by several researchers (see, for example, *Science*, Vol. 212, May 22, 1981, "Speech Perception without Traditional Speech Cues").

At any instant of time, the inputs 2 to the preprocessor circuit 20 (FIG. 2) have binary values of voltage—no different than the binary values of voltage described previously with regard to FIGS. 8, 9A, 10A, 10B 10C and 11. While a particular sound pattern 11 may occasionally be recognized by simply knowing the speech pattern at any instant, more often the speech patterns 11 can only be recognized by knowing how the sound pattern changes with time. The time-varying frequency content of an acoustic signal is commonly called a "voice-print" or sound spectrogram; often the frequency content is graphed as a function of time to produce voice prints used by speech experts and the like (see *Science*, Vol. 210, 24 October 1980, "Multidimensional Scaling, Tree Fitting and Clustering").

Figure 19:
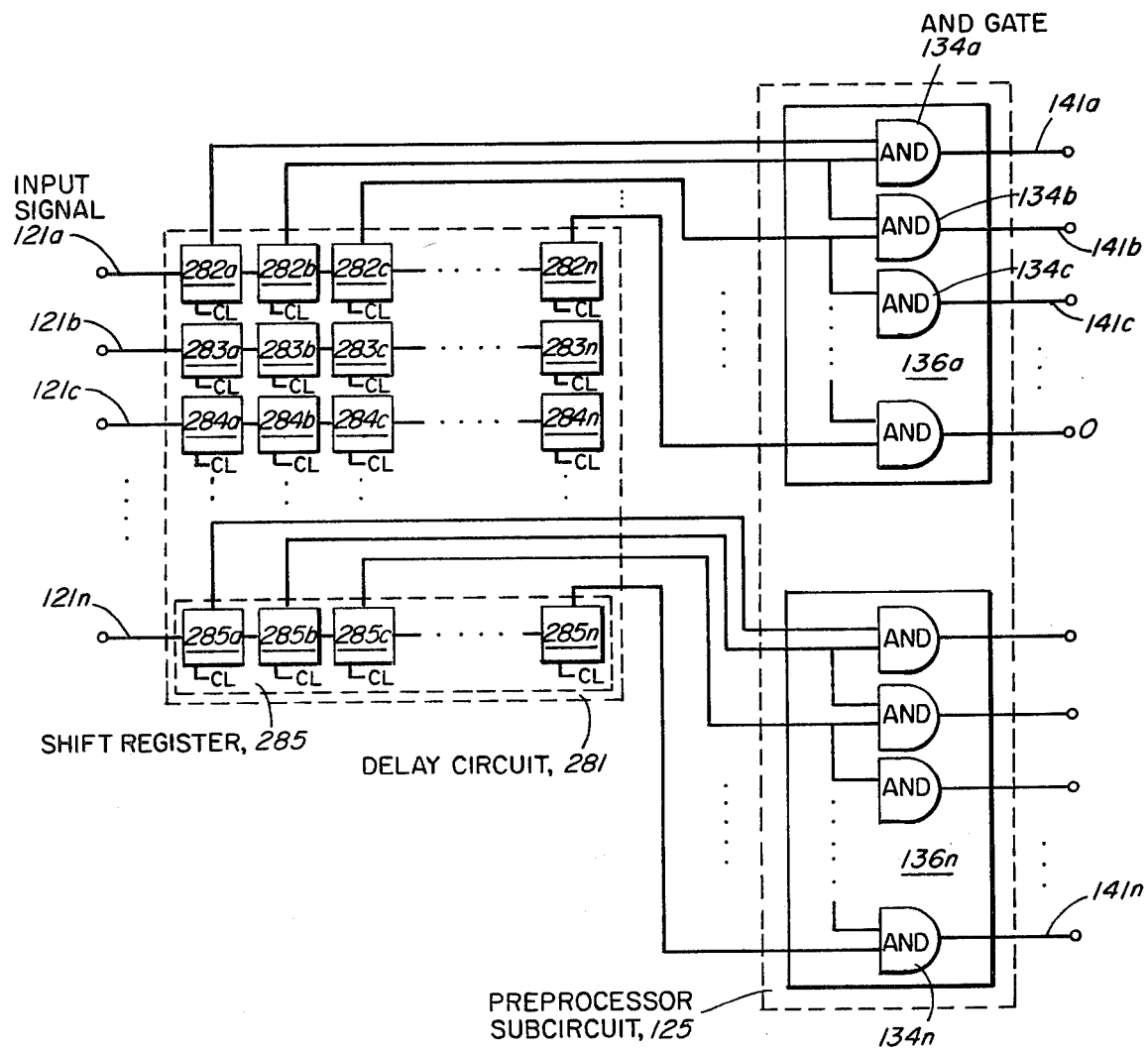
FIG. 19 is a diagrammatic representation of a further modification of the circuit in FIG. 9.

In FIG. 19, the inputs labeled 121a . . . 121n are fed into a delay circuit 281 before being preprocessed by preprocessor subcircuits 136a . . . 136n such as were previously described in relation to FIG. 9. The input signals 121a . . . 121n are transmitted to a column of shift registers whose individual bits are identified by register bits 282a . . . 285n. The function of each bit in a shift register is to hold its digital data or pass its data on to the register bit on its right. The transfer of data (or shifting) occurs when a clock signal, designated CL in FIG. 19 is received by the registers bits 282a . . . 285n.

Each time cycle, digital data is fed to the input connections 121a . . . 121n and is held in the first column of shift registers bits (i.e., 282a, 283a, 284a . . . 285a) for the duration of that time cycle. At the end of the time cycle, the data in each bit column is shifted to the column to its right. For example, the data stored in bit column 282a . . . 285a is shifted to 282b . . . 285b; that in bit column 282b . . . 285b is shifted to 282c . . . 285c, and so forth for each bit column. During operation, all the shift registers hold their data for the active portion of the cycle; shifting of data and addition of new data from connections 121a . . . 121n occurs only between the active portions of the time cycles and is initiated by the clock signal CL.

The pre-processor sub-circuits 136a . . . 136n for a time-varying signal work in much the same way as previously described for static signals (in relation to FIG. 9 for example). The only difference is that they operate only during that part of the time cycle in which the data is not being shifted. In the example shown in FIG. 19, a row of registers 282a . . . 282n may represent high frequency band data coming from a band-pass filter 270a (FIG. 18) set to a high frequency. Registers 285a . . . 285n may represent a low frequency band, with other registers (e.g., 283a . . . 283n) representing intermediate frequency bands. If the acoustic signal from the sound source in FIG. 18 represented, say, the hissing sound of the spoken letter "S", one expects filters 270a, 270b, and 270c (which may correspond to higher frequencies) to be activated since this sound has high frequency content.

As the hissing sound begins, register bits 282a, 283a and 284a store data received from connectors 121a, 121b and 121c during the first time cycle. When the hissing sound continues, this same data is shifted on, first to the register bits 282b, 283b and 284b in the next time cycle and then to the register bits 282c, 283c and 284c in the following time cycle. As data is shifted out of register bit column 282a . . . 285a, new data is added via input signals 121a . . . 121n during the shift. Let it be supposed that the hissing sound lasts for three times cycles such that, when the sound ends, data is stored in nine register bits: 282a . . . 282c, 283a . . . 283c 284a . . . 284c. At this time, the preprocessing sub-circuit in 136a in FIG. 19 has simultaneous inputs to AND-gates 134a and 134b giving signal outputs at connections 141a and 141b occurring during the third time cycle. Signals occurring at these two connections are used by self-organizing circuit 21A in FIG. 2 to determine the signal specifying the hissing sound whose duration is three time cycles. Of course signals from sub-circuits 136b . . . 136n are used in conjunction with the signals from the sub-circuit 136a to identify other frequency band information; in this example, only the sub-circuits 136a, 136b and 136c (corresponding to input signals at connections 121a, 121b and 121c) have signals transmitted to self-organizing circuit 21A.

Other preprocessing sub-circuits 125, are possible for dynamic or time-changing signals. Just as static signals can use information from columns of pixels to determine vertical line patterns (as was previously described), so can simultaneous signals from several frequency bands be analyzed by preprocessor circuits similar to sub-circuits 136a . . . 136n in FIG. 19. For example, the hissing sound discussed may be identified by simultaneous active signals from the higher frequency band sensors (e.g., 270a, 270b and 270c in FIG. 18) which input signals at connections 121a, 121b and 121c. AND-gate combinations of these signals by preprocessor sub-circuits 125 can feed information to a self-organizing circuit 21A that indicates the width of the frequency bands of the incoming sound signals: in this case, the hissing sound has frequency content in the highest three frequency bands. Just as static signals use AND-gate combinations of rows or columns of pixels in preprocessor circuits, so can dynamic signals use AND-gate combinations of rows or columns of shift register bit data during any particular time cycle. Similarly, OR-gate combinations can lead to preprocessor determination of either row or column information from shift registers just as was previously discussed for rows or columns of pixels.

In summary, the preprocessor circuits 20 (FIG. 2) for static or time-varying signals operate in the same way: AND-gate or OR-gate combinations of rows, columns and so forth trigger the output signals 25 from the preprocessor circuit 20. For static signals from pixel arrays, the rows and columns are rows and columns of the pixel outputs themselves such as 130a . . . 130n in FIG. 9. For time-varying signals the bit columns represent data stored in shift registers for all input signals during a particular time cycle (such as the register bits 282a . . . 285a in FIG. 19); the rows represent data stored in a shift register of a particular input signal for many successive time steps (such as shift register 285 in FIG. 19). In static signals, the output signals 25 are operated upon at any time the input information from the sensors are present; in time-varying signals these outputs 25 are operated upon during active portions of each time cycle.

Usually, static preprocessor circuits are distinct from time-varying ones. However, for certain pattern-recognition tasks of static patterns 11, aspects of time-varying preprocessor circuits may be used. For example, if printed words are to be recognized as in hand-writing recognition, optical sensors 10 may be fabricated into a horizontal or a vertical array of pixels which are moved over the letters in a scanning manner. Instead of an entire pattern 11 the pixels 10 are only exposed to a vertical strip of the pattern 11 at any instant; other vertical strips of the pattern are exposed to the pixel array as time progresses. Just as time-varying patterns associated with acoustic energy may be recognized as discussed earlier, so may time-varying patterns which represent the scanning of letters or words by an optical array of pixels.

Scanning of patterns 11 can provide important information to the self-organizing circuits such as the circuit 21. Scanned patterns give "ordering" of information. For example, if the circuit 281 shown in FIG. 19 represented a vertical scan of the capital letter "L", the register bits 282n . . . 285n may be activated by the vertical stroke of the letter while the register bits 285a . . . 285n may be activated by the horizontal stroke. AND combinations of the register bits 282n . . . 285n identify the vertical stroke via circuits similar to circuits 136a . . . 136n while AND combinations of the register bits 285a . . . 285n identify the horizontal stroke via circuits such as 136n.

Outputs of preprocessor circuits (such as 136a . . . 136n in FIG. 19) identify "ordering": the order in which the vertical stroke pattern appeared in relation to the horizontal stroke pattern. In the example, the left-to-right scanning pixel array identifies first the vertical stroke and then the horizontal stroke, which may be an important element in recognizing the scanned letter "L". The capital letter "J" has nearly the same elements as the letter "L" but the ordering is different: a left-to-right scan recognizes the near-horizontal stroke before the vertical stroke. Perhaps an important distinguishing feature in recognizing the letter "J" is its ordering compared to the letter "L". By scanning, such pattern characteristics as "above", "below", "before" "after" can be used by self-organizing circuits such as circuit 21 to recognize patterns.

The circuits described so far show how arrays of the DAC subcircuits 70a . . . 74n (FIG. 7A) fed with information from pre-processor circuits such as the circuit 120 can self-organize the information of static or time-varying patterns 11 directed on input sensors 10 (FIG. 1). While the method described will perform as a self-organizing circuit, it is not a particularly efficient way to make a self-organizing circuit.

The number of inputs which actually carries information about a particular pattern 11 may be a tenth of the total inputs 25a . . . 25n. In the example discussed in relation to FIG. 7A, most of the capital letter "A"s were defined by only a few inputs such as 25a, 25b, 25c; in general, one would expect considerably more active inputs than three but also somewhat fewer than the total possible inputs 25a . . . 25n. Consequently, one could argue that most of the DACs 70a . . . 73n are not being used: only if an active input signal 25a . . . 25n matches an active output signal 26a . . . 26n in FIG. 7A is the particular DAC corresponding to that column and row significant Perhaps only 10% or 20% of the DACs 70a ...73n actually have non-zero numbers stored in their respective up/down counters 67.

Figure 12:
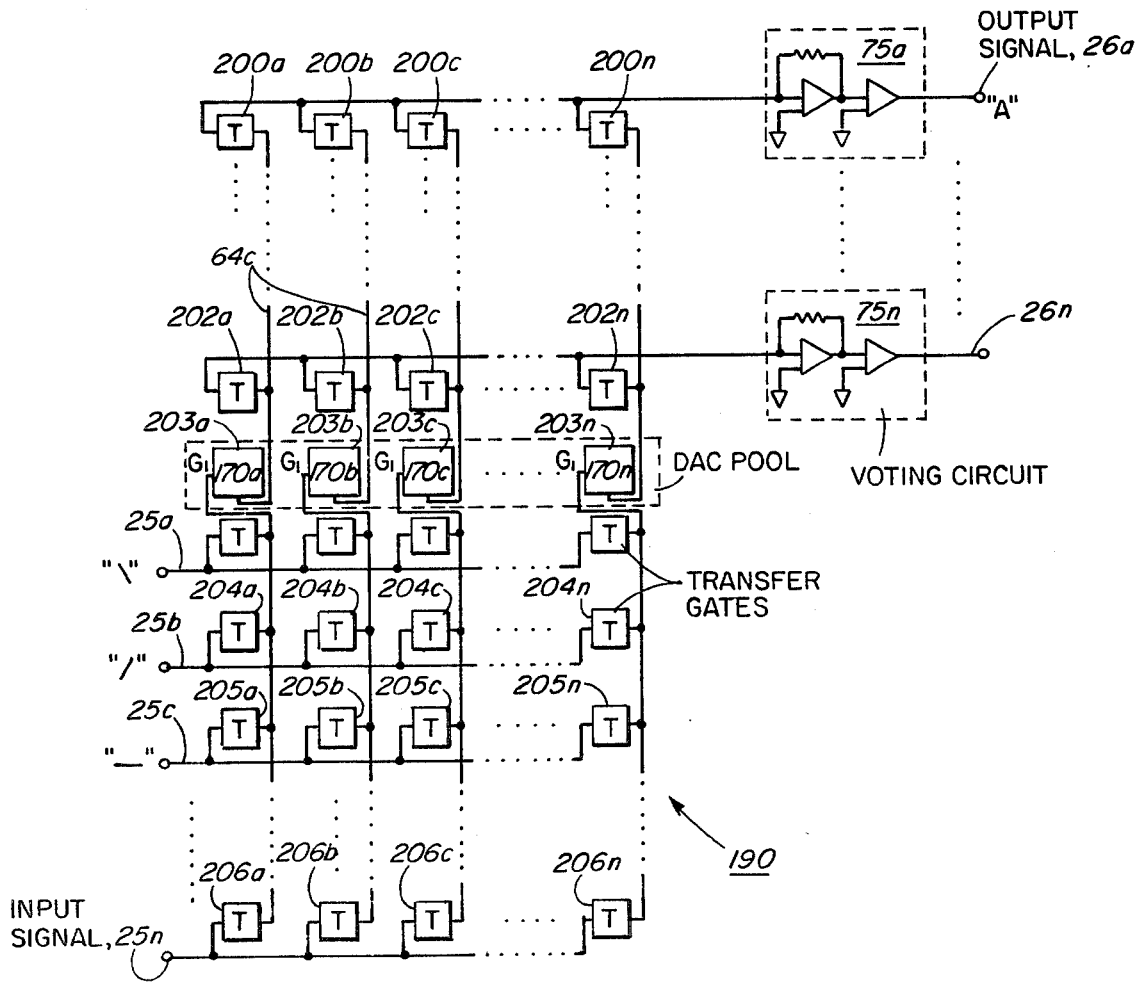
FIG. 12 is a diagrammatic representation of a modification of the circuit of FIG. 7A.

The dilemma of sparsely-populated DACs 70a ... 73n which are used to output current to voters 75a ... 75n can be solved by "assigning" a particular DAC to a column (e.g., the column associated with input 25a) and also to a row (e.g., the row associated with output 26c). The circuit marked 190 in FIG. 12 shows how this assignment can occur using DACs 170a ... 170n, similar to those discussed in connection with FIG. 7A. Inputs to the circuit 190 are, as in FIG. 7A, signals 25a ... 25n; outputs from the circuit are also similar: signals 26a ... 26n. However, the DACs 170a ... 170n can be connected between any input signal 25a ... 25n and any output signal 26a ... 26n through the use of transfer gates 200a ... 202n with respect to the output signals and 203a ... 206n with respect to the input signals.

In operation, the teaching computer 9 (FIG. 1) opens transfer gates in a manner which connects a particular input connection to a particular output connection, including one of the DACs 170a ... 170n in the connection. For example, if input signals 25a, 25b and 25c again represent respectively a left diagonal, a right diagonal and a horizontal while output signal 26a again represents a capital letter "A", the teaching computer 9 assigns DACs as follows. When an input pattern representing the letter "A" is applied to the sensors 10, the connections 25a, 25b and 25c may well be expected to have positive signals. The teaching computer 9 assigns DAC 170a to the output 26a by triggering and the gate 203a in FIG. 12 via its transfer gate 50c (shown in FIGS. 5A and 5B but not shown in FIG. 12 for clarity). Similarly, the DAC 170a, has its output connection 64c (FIG. 6A), through which current is fed to the voter 75a, connected by triggering the transfer gate 200a, using the teaching computer 9 to trigger the transfer gate 200a through its gate signal 50c. Thus, an input signal (such as the signal 25a) is assigned to a DAC (such as the DAC 170a) by triggering an appropriate transfer gate (such as the gate 203a); the DAC is then connected to a summing junction by triggering another transfer gate (such as the gate 200a). In like manner, the input connection 25b can be assigned to DAC 170b by triggering the transfer gate 204b and to the output connection 26a by triggering the gate 200b.

Essentially, the pool of DACs 170a ... 170n can be assigned to any input signal 25a ... 25n and to any output connection 26a ... 26n. Punish or reward signals for each DAC 170a ... 170n (not shown in FIG. 12 but implemented by addressing parallel control gates) are activated by the teaching computer 9 during "lessons" to alter the binary number in the DAC's counter 67, as previously discussed; the computer—which has assigned a particular DAC to an input and output connection—is also programmed to activate punish/reward signals of the particular DAC, as was discussed previously. Note that the computer 9 becomes a necessary part of the self-organizing circuit 190 since the appropriate transfer gates 200a ... 206n are triggered by it; in other embodiments, the transfer gates 200a ... 206n can be latched after triggering to allow the circuit 190 to operate independent from the computer 9 during the recognition mode.

The analog methods discussed so far are based on the assumption that a digital-to-analog coverter is the primary element by which currents are fed to voters such as 75a ... 75n. The DACs are used primarily to elucidate the function of the self-learning circuits such as the circuit 21 and are not necessary components of a self-learning circuit. What is necessary is a mechanism by which the current to a summing junction can be modified by various learning experiences; the DAC is simply one way this task can be accomplished.

Figure 13:
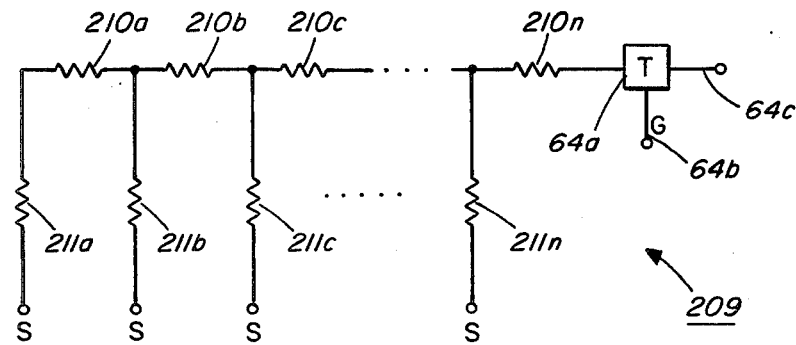
FIG. 13 is a diagrammatic representation of a modification of the circuit in FIG. 6A.

In other self-learning circuits, the "weighting" of weighting elements can themselves be modified rather than modifying a binary number stored in the counter of a DAC. FIG. 13 shows a circuit 209 that includes a ladder network of weighting elements 211a 211n similar to that shown in FIG. 6A; each of the weighting elements 211a ... 211n is connected to a supply source, again labeled S. As in the DAC 60 in FIG. 6A, a transfer gate 64a is activated by an input signal 25a ... 25n when the circuit 209 in FIG. 13 replaces a DAC 70a ... 74n in FIG. 7A. The gate signal, again labeled $G_1$, "enables" the circuit 209 i.e., causes electric flow through the weighting element network 210a ... 211n. It will be noted that other weighting element arrays than ladder networks are also usable. Moreover, the weighting elements can take a number of forms depending on the analagous medium (e.g., pressure,voltage) which the elements weight. Henceforth, an electrical medium will be discussed for simplicity, but the arguments apply to other mediums as well.

During learning, the teaching computer 9 (FIG. 1) modifies the weight of the elements 210a ... 211n in various ways. One method used in solid state electronics today is to use "laser-trimming" whereby lasers (or electron beams) are guided by the teaching computer 9 to alter slightly the values of the weighting by physically removing element material from the electronic circuit. The elements 210a ... 211n may also be modified by using the laser (or electron beam) to disconnect one or more elements 211a ... 211n from its supply source S, much as the transfer gates 63a ... 63n of FIG. 6A disconnected various weighting elements from their supply sources. Since the supply source S could be either positive or negative voltages, it is possible to have virtually any current (within limits) at output connection 64c (FIG. 13), either as a source of current to a summing junction or as a drain of current from a summing junction. The binary number stored in the binary up-down counter 67 of a DAC in the circuit 60 of FIG. 6A can be stored instead in the teaching computer 9 during the learning mode operation of the circuit 209. After completion of "lessons", the weighting elements 210a ... 211n can provide virtually the same current to the output connection 64c as the DAC 60 in FIG. 6A would.

The arrangement in FIG. 13 is particularly convenient for transferring the learned information of a DAC-based circuit, such as shown in FIG. 7A, to a much simpler circuit. For example, a master DAC-based self-organizing circuit can be laboriously taught to recognize various patterns 11. Once the weighting of the resistors 61a ... 62n (FIG. 6A) are known, these resistor-weightings can be incorporated into the manufacturing process of identically functioning "clone" circuits which do not need to be individually taught (e.g., based on circuits such as circuit 209). These circuits would not be self-organizing circuits themselves, but they would operate in recognition mode identically to the DAC-based circuit from which they were derived: the output currents of circuit 209 would be identical to those of a DAC 70a ... 74n in FIG. 7A. In addition, a master circuit which has been "taught" can have counter contents of its DACs transferred into other identical circuits. Learning is initialized by transferring laborious teaching but would still allow continued learning or repair later on. A disadvantage of a living organism is that each one must be individually taught to organize its brain neurons properly. This is not true of self-organizing electrical circuits since a master circuit can do the learning and its "knowledge" can be transferred to other "clone" circuits, as described above. Thus in self-organizing electrical circuits, each need not be individually taught.

Other methods of altering the weighting element values of the circuit 209 are also possible. Chemical means for modifying weighting elements include plating techniques in which the weight of an individual element 210a ... 211n is modified by plating or diffusing more material onto the element during learning mode operation. Depending on polarity, metal associated with the elements 210a ... 211n can also be removed electro-chemically. Optical means for modifying the current output of a circuit such as the circuit 60 in FIG. 6A (other than laser trimming as previously discussed) include ultraviolet radiation which bleeds charge from optically-triggered transfer gates 63a ... 63n in FIG. 6A or 200a ... 206n in FIG. 12. Similar methods are presently used in erasing the memories of programmable read-only memories (PROMs). Electrostatic methods of altering the elements 210a ... 211n in FIG. 13 may use local static charges to attract conductive particles to particular regions, much as xerography uses these same kinds of electric charges for copying processes. Electromagnetic means may be used to alter the current output of a circuit similar to the circuit 60. The transfer gates 63a ... 63n can be switched by the polarity of a magnetic material that is detected by a magnetically sensitive switch; the polarity of the magnetic material may be altered during learning by external magnetic fields applied to the material much as the magnetic polarity of the tape in a tape recorder is changed by the recording head. In all these methods, the teaching computer 9 controls either the alteration of the weighting element 210a ... 211n in FIG. 13 in a circuit 209 or controls the state of transfer gates 63a ... 63n in circuits similar to the circuit 60. Other methods of altering the elements 210a ... 211n or of controlling the state of transfer gates 63a ... 63n under control of the teaching computer 9 are also possible to those skilled in the art.

Circuits such as the circuit 60 in FIG. 6A may well be considered a "hybrid" self-organizing circuit: it stores its learned information in a binary number of the counters 67 of its DACs 70a ... 74n (FIG. 7A); yet the information is summed in analog fashion since the summing junctions 75a ... 75n act on analog currents provided by the DACs. Both digital and analog circuits are combined in a self-organizing circuit 21 shown in FIG. 7A. However, the self-organizing circuit in which an alterable weighting element array such as the circuit 209 (FIG. 13) replaces DACs in either the circuit 21 (FIG. 7A) or the circuit 190 (FIG. 12) is an analog circuit: it uses only electrical currents as input to voting circuits to provide the recognition of input patterns 11. Except for the transfer gates such as gate 64a, there are no binary states—state which are usually associated with digital circuits.

In addition to analog self-organizing circuits and hybrid self-organizing circuits, there are digital self-organizing circuits. A digital self-organizing circuit has functional similarity to the hybrid circuit 21 in FIG. 7A. However, instead of DACs which output current that is subsequently added in voters 75a ... 75n, the digital circuit simply has registers (similar to the up-down counters of the DACs 70a ... 74n) which have their binary numbers digitally added together to obtain a criterion upon which to output a signal at connections 26a ... 26n. In a digital circuit, no digital-to-analog converters (DACs) are needed and no voters are needed to sum the currents of these DACs.

Figure 14:
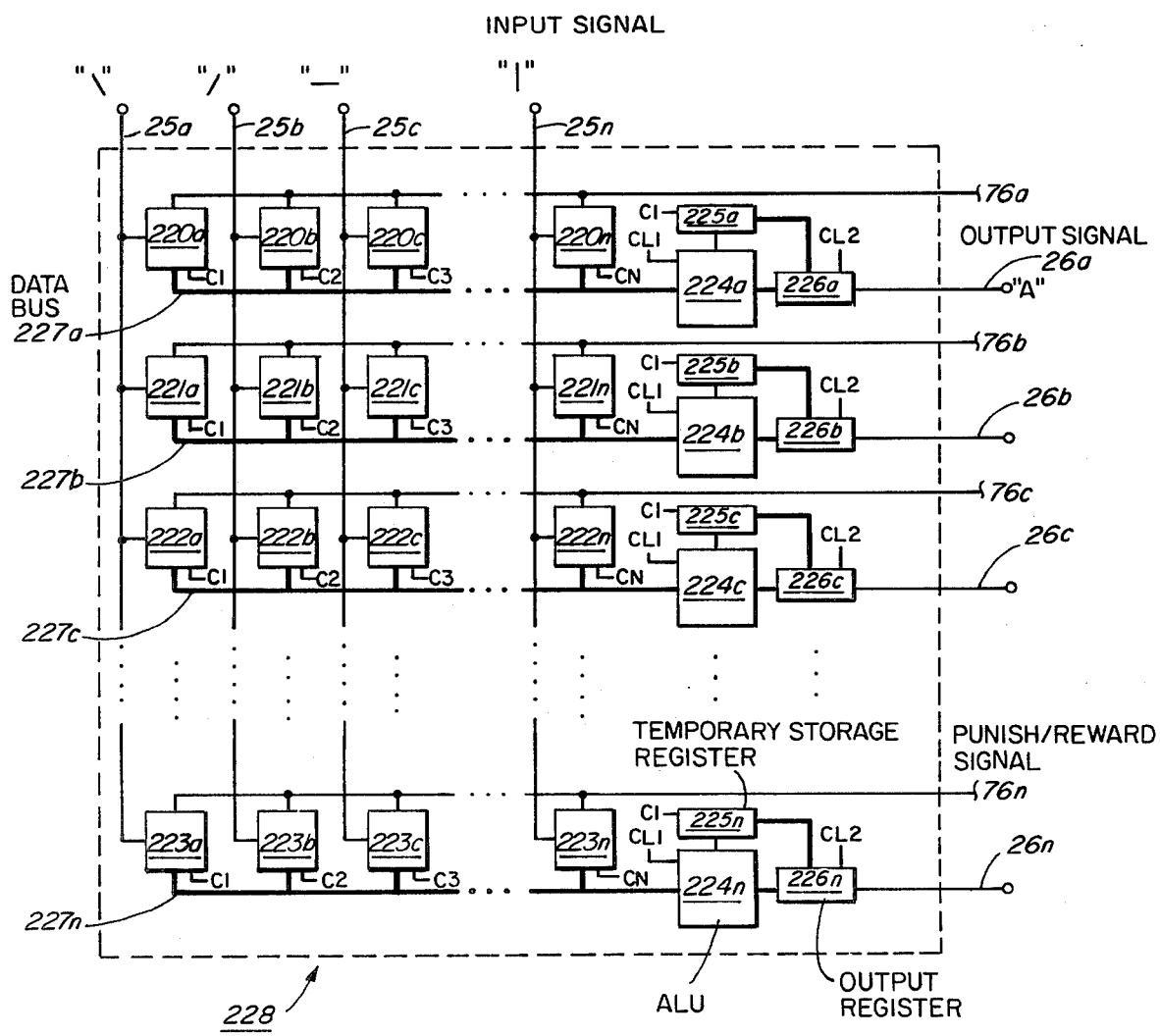
FIGS. 14 and 15 are diagrammatic representations of a modification of the circuit in FIG. 7A.

The self-organizing circuit marked 228 in FIG. 14 uses only digital information to effect the self-organizing aspects of circuit 1 in FIG. 1, and is one form of purely digital circuit that may be employed in accordance with the present teachings. The circuit 228 is similar in many ways to the circuit 21 of FIG. 7A: the inputs 25a ... 25n in FIG. 14 are connected to columns of registers 220a ... 223n such that an input signal 25a is connected to all registers in column 220a ... 223a; an input signal 25b is connected to all registers in column 220b ... 223b, and so forth. In the circuit 220, the DACs 70a ... 74n of FIG. 7A are replaced by the registers 220a ... 223n, while keeping the input connections 25a ... 25n and the punish/reward connections 76a ... 76n to function as they did in circuit 21 of FIG. 7A. As noted earlier, threshold registers (not shown) which perform the function of DACs 74a ... 74n may be required in certain digital self-organizing circuits. The registers 220a ... 223n hold the value of the binary number which represents the "path-weighting" between the inputs 25a ... 25n and the outputs 26a ... 26n; these registers are simply up-down counters like the counters 67 in FIG. 6A. The outputs 66a ... 66n of the circuit 60 (FIG. 6A) become the data buses labeled 227a ... 227n of each row of the registers 220a ... 223n in FIG. 14. The data buses 227a ... 227n are a set of parallel connections, each line of which represents a different bit of the binary number stored in the registers 220a ... 223n. The data buses 227a ... 227n are connected to arithmetic logic units (ALUs) 224a ... 224n. Also connected as input to the ALUs 224a ... 224n are temporary storage registers 225a ... 225n.

The function of each ALU 224a ... 224n is to add together the binary numbers applied as input to it from respective registers 220a ... 223n and from temporary storage registers 225a ... 225n; the output is the binary sum of the numbers and is stored in output registers 226a ... 226n. While a "binary-weighted" sum is performed by most ALUs, this need not be the case; binary bits may be "linearly" summed, for example in certain self-organizing circuits based on charge coupled devices. The output signals at 26a ... 26n in FIG. 14 represent the sign bit of the registers 226a ... 226n. A positive binary number stored in the registers 226a ... 226n will cause an output signal at 26a ... 26n; a negative binary number will not cause an output. The digital self-organizing circuit 228 requires timing signals going to each column of the register bits 220a ... 223n to insure that the ALUs 224a ... 224n operate properly, as will now be explained.

Let it be assumed, as before, that signals 25a ... 25c in FIG. 14 exist and represent respectively a left diagonal, a right diagonal and a horizontal; these signals are assumed for simplicity sufficient to cause an output signal at the connection 26a in FIG. 14, signifying that the letter "A" was recognized. The signal 25a applied as input to the register 220a enables the binary word stored in the register to be fed to the ALU 224a only when the clock signal labeled $C_1$ is also present. The external computer 9 (FIG. 1) sequences clock signals $C_1$ through $C_n$ such that the contents of each register $220a \ldots 220n$ are sent sequentially via the data bus $227a$ to the ALU $224a$. In operation, first the clock signal $C_1$ is switched on; if a signal $25a$ is present, then the contents of the register $220a$ are transmitted to the data bus $227a$. Initially the temporary storage registers $225a \ldots 225n$ are cleared (set equal to zero binary value) by the first clock pulse signal $C_1$; hence the ALU $224a$ sums the contents of the register $220a$ and binary zero to give an output to the register $226a$ equal to the contents of the register $220a$. A clock signal $CL_1$ causes the ALU $224a$ to perform a binary sum of the data on bus $227a$ and the contents of register $225a$, allowing the summation to be fed and stored in the register $226a$; then a summation clock signal $CL_2$ transfers the contents of the register $226a$ to the temporary storage register $225a$.

When clock pulse $C_2$ is active, the contents of register $220b$ (the binary path weighting number associated with a right diagonal) are transmitted to the data bus $227a$. The ALU $224a$ adds the contents of register $220b$ to that in the temporary storage register $225a$; the result is fed to the register $226a$ (and also stored by the register $226a$) at the initiation of a clock signal labeled $CL_1$. At clock signal $CL_2$, the binary number stored in the register $226a$ is transferred to the register $225a$ for temporary storage of the binary number stored in the register $226a$.

The process continues with each of the registers in the row (i.e., registers $220c \ldots 220n$) as each clock signal $C_3 \ldots C_n$ is triggered in sequence. Between each of the register clock signals $C_1 \ldots C_n$, the two ALU clock signals $CL_1$ and $CL_2$ are sequentially triggered to allow each register of the respective row to be summed by the ALU $224a$. After the clock signal $C_n$ is sequentially triggered, all the registers $220a \ldots 220n$ which had inputs at connections $25a \ldots 25n$ will have had their contents transferred to the ALU $224a$. The register $225a$ adds the previous total of binary numbers (as stored in the register $226a$) to the newest register contents. The net effect is that by the time clock signal $C_n$ has been triggered, the contents of each register which has an input signal $25a \ldots 25n$ (in this simple example, registers $225a$, $225b$ and $225c$) is summed by the ALU $224a$ in FIG. 14, the sum being left in the register $226a$. If the sum is positive, the sign bit of register $226a$ will be triggered, giving an output at the connection $26a$ in FIG. 14; if the sum is negative, the sign bit will not be triggered and no output will appear at the connection $26a$. For this example, presumably the contents of the registers $220a$, $220b$ and $220c$ is large giving a positive total and causing the proper response: that the letter "A" has been recognized and an output signal at the connection $26a$ has been generated.

The learning mode for the digital self-organizing circuit $228$ is similar to that for the self-organizing circuit $21$ discussed earlier. A register represents a path "weighted" by its contents. Paths (i.e., registers $220a \ldots 223n$) which lead to correct results (as determined by computer 9, in FIG. 1) are rewarded via reward lines $76a \ldots 76n$ in FIG. 14, by increasing the value of the binary number stored in that particular register—just as the up-down counters $67$ in the DACs $70a \ldots 73n$ in FIG. 7A were rewarded. Paths which resulted in incorrect results (i.e., registers whose inputs give an incorrect signal) have their contents reduced via the punish lines $76a \ldots 76n$ in FIG. 14. In general, bias or threshold devices are not usually required in a digital self-organizing circuit such as the circuit $228$ since the registers $220a \ldots 223n$ can have either positive or negative binary numbers without increasing the cost of the register; in analog devices, DACs which can output either positive or negative currents to a voting circuit are more expensive than positive-only or negative-only DACs. However, a "threshold" register $220n \ldots 223n$ may be used in certain self-organizing circuits.

Oft-rewarded "paths" will have high positive binary numbers stored in their respective registers $220a \ldots 223n$, tending to cause an output signal at the connections $26a \ldots 26n$ in FIG. 14. Oft-punished "paths" will have high negative binary numbers stored in their respective registers $220a \ldots 223n$, tending to prevent an output at the connections $26a \ldots 26n$. The former mimic the excitory synapses of neurons in living organisms, the latter mimic inhibitory synapses of neurons. As learning proceeds under the direction of the computer 9 in FIG. 1, output signals transmitted to the next level circuit tend to include only oft-rewarded input signals $25a \ldots 25n$ and to exclude oft-punished input signals $25a \ldots 25n$.

Figure 15:
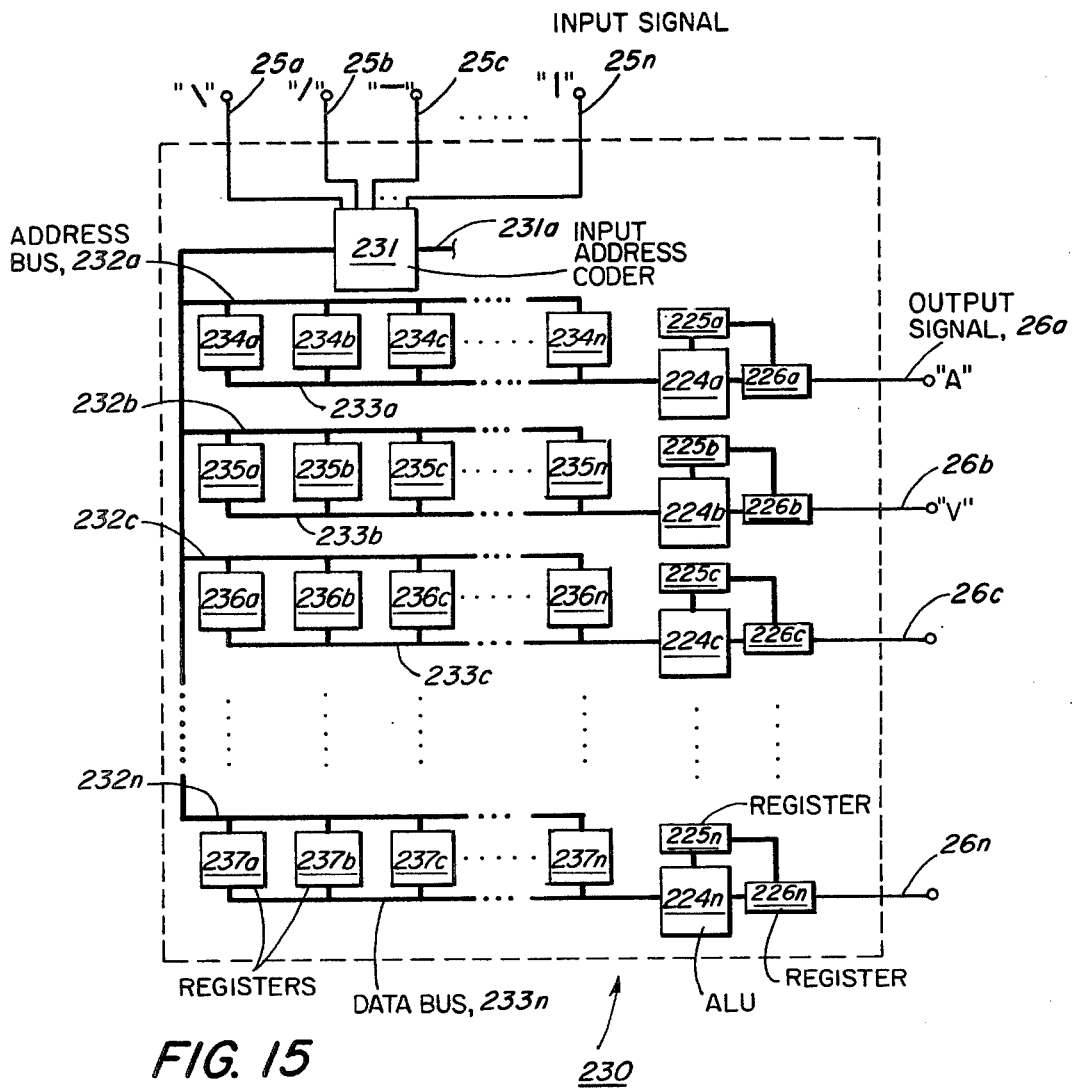

While the circuit $228$ is a plausible method of producing a digital self-organizing level circuit, it tends to be very inefficient in the use of components. Not all the registers of any row (e.g., $220a \ldots 220n$) are used to give any particular output signal $26a \ldots 26n$. Thus, some registers $220a \ldots 223n$ are wasted just as some of the DACs $70a \ldots 73n$ of the circuit $21$ (FIG. 7A) are wasted. The circuit numbered $230$ in FIG. 15 is the digital equivalent of the "DAC pool" scheme discussed in connection with the hybrid circuit $190$ of FIG. 12. Instead of using transfer gates to direct the proper input signal $25a \ldots 25n$ to a particular DAC $170a \ldots 170n$ and then direct its current to the proper summing junction $75a \ldots 75n$ (as in the circuit $190$ FIG. 12), each register $234a \ldots 237n$ in FIG. 15 is addressed via respective address buses $232a \ldots 232n$ to determine the input with which it is associated; then the contents of the identified registers are transmitted on data buses $233a \ldots 233n$ to be transferred to the respective ALU $224a \ldots 224n$.

Figure 16:
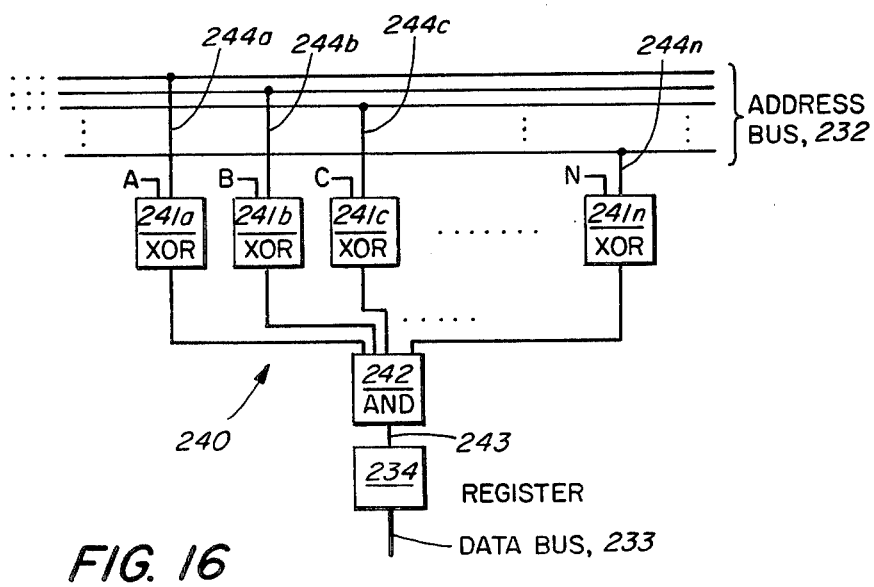
FIG. 16 shows diagrammatically a simple decoding mask circuit.

In the circuit $230$, which is a digital equivalent of a level circuit such as one of the circuits $21A \ldots 21N$ in FIG. 2, the input signals $25a \ldots 25n$ are fed into a coder $231$. The input address coder $231$, via bus $231a$ to the computer 9 in FIG. 1, converts each input signal $25a \ldots 25n$ in FIG. 15 to a binary number consistent with the "address" of an appropriate register $234a \ldots 237n$; the "address" is a binary code which can be interpreted by the registers because each register $234a \ldots 237n$ has its own unique address code. The registers $234a \ldots 237n$ have circuits such as the circuit labeled $240$ in FIG. 16 which can compare their address to the binary address sent out on address buses $232a \ldots 232n$. The circuit $240$ is a compare circuit. The input address bus labeled $232$, but representing individual signals $232a \ldots 232n$, has connections $244a \ldots 244n$ to XOR-gates $241a \ldots 241n$; each of the address wires of bus $232$ is connected to one of the XOR-gates $241a \ldots 241n$. An XOR-gate performs an "exclusive OR" function: the output is active if either both inputs are active or both inputs are inactive. Also connected to each XOR-gate are signals labeled A, B, C $\ldots$ N which represent the unique address code for that particular register. The signals A $\ldots$ N have values of one or the other of two binary states; binary combinations of these signals represents a binary number specifying the address of the register. If all the address signals at the bus $232$ exactly match the signals A $\ldots$ N on a bit-by-bit basis, each of the XOR-gates $241a \ldots 241n$ will trigger, in turn causing the multi-input AND-gate shown at $242$ to trigger to provide an output signal at connection 243. If any of the address signals (either active or inactive) does not match the address code A . . . N, then not all the XOR-gates 241a . . . 241n will trigger, and the AND-gate 242 will not fire giving an inactive signal at the connection 243. The multi-input, AND-gate 242 must have all input signals to it triggered, else it will have no active output. Other compare methods are possible in this application; circuit 240 is simply one possible method.

The net effect of the simple compare circuit 240 is that an address signal sent on the bus 232 can be applied as input to all the registers 234a . . . 237n in FIG. 15, but only the one addressed will recognize the code by having an output at the connection 243. The signal 243, in turn, causes the register 244 to output to the data bus labeled 227 in FIG. 16 (but representing any of the data buses 227a . . . 227n in FIG. 15), the value of the binary number stored in that register.

In operation of the circuit 230 in the context of FIG. 1, the learning computer 9 necessarily becomes an integral part of the self-organizing circuit 1. It is the computer 9 which is programmed to interpret an input signal 25a . . . 25n as being associated with particular outputs 26a . . . 26n and specifies to the coder 231 via input port 231a which of registers 234a . . . 237n is to be addressed. For example, let it be assumed that signals 25a, 25b and 25c represent (as before) a left diagonal, a right diagonal and a horizontal and that the signal 26a (FIG. 15) represents a recognized capital letter "A". During the learning mode, the register 234a may be assigned by the computer 9 to represent an input signal 25a, 234b to represent the signal 25b and 234c to represent the signal 25c. (It will be noted here that reward-/punish lines and clocking lines have not been shown for clarity in FIG. 15 Altering the binary number stored in registers 234a . . . 237n can be accomplished in a manner similar to that described in reference to FIG. 14, as would clocking functions performed on the ALUs 224a . . . 224n and the registers 226a . . . 226n and 225a . . . 225n). Whenever a a signal 25a in FIG. 15 is applied as input to the circuit 230, the computer 9 knows (via its own internal memory and programs) that the address of the register 234a (among others) is to be applied as output onto address buses 232a . . . 232n. On receiving the proper address from the address bus 232a, the decoding circuit of the register 234a will cause the value of its stored binary number to be transmitted to the ALU 224a via the data bus 233a. To get an output representing the letter "A" at the connection 26a in FIG. 15, other signals such as 25b and 25c are also applied as input simultaneously to the circuit 230. Each of these signals are sequentially coded by the input address coder 231 in FIG. 15 and the computer 9 in FIG. 1 such that the contents of the appropriate registers (in this case, the registers 234b and 234c) are sent to the ALU 224a to be summed in the manner described previously. If the sum is large enough (i.e., has a positive sign bit), the signal 26a will trigger specifying that the letter "A" was recognized. This signal can be used for altering the values of the binary numbers in the registers 234a . . . 237n during the learning mode or it can be used simply as an indication of a recognized pattern 11.

In a more elaborate implementation of circuit 230, the address codes (labeled A . . . N in FIG. 16) of each register may also be specified by the computer 9. Thus, several different registers of the pool 234a . . . 237n can have the same address code. For example, if the signal 26b in FIG. 15 were to represent a letter "V", both the register 234a and the register 235a are assigned the same address code (signals A . . . N in FIG. 16). A signal 25a representing a left diagonal is coded by the coder 231 (FIG. 15) to specify the address of both of the registers 234a and 235a. The summing function in the ALUs 224a and 224b then proceeds simultaneously rather than sequentially, that is, rather than first addressing one register (say the register 234a) and then the others (in this case register 235a). Ideally, the computer 9 has a specific address for each of the input signals 25a . . . 25n; then the registers 234a . . . 237n need only recognize the address of the particular input signal 25a . . . 25n which was assigned to that particular register. The sequential coding of each input signal 25a . . . 25n may be accomplished using the computer 9 (FIG. 1) via the bus 231a in FIG. 15, or it may be accomplished by a specialized sequencing circuit (not shown, but whose operations are similar to those of circuit 250 of FIG. 17, to be discussed shortly).

The digital self-organizing circuit 230 has advantages over the circuit 228 in that much fewer registers (234a . . . 237n in FIG. 15) are required. As discussed earlier (with regard to the hybrid circuits 21 in FIG. 7A), most of the registers 220a . . . 223n of the circuit 228 would not be expected to have useful information stored (i.e., large positive or negative binary numbers having large influences on the output summations of the ALUs 224a . . . 224n). In the circuit 230, however, only those input signals 25a . . . 25n which have large influences over the outcome of the output signals 26a . . . 26n are assigned to registers by the computer 9. Not only are fewer registers 234a . . . 237n required in a circuit such as the circuit 230, but the time required to obtain an output is less: the circuit 228 must add sequentially by ALUs 224a . . . 224n all registers in each row (whether they have useful information or not), while the circuit 230 need only sequentially add the registers which have useful information. (Hereinafter the label 224 designates any one of the ALUs 224 . . . , the label 225 designates any of the registers 225a . . . , and, the label 226 designates any one of the registers 226a . . . )

In digital implementations of self-organizing circuits such as the circuit 228 and the circuit 230, an ALU summing circuit (composed of the ALU 224, and the registers 225 and 226 along with appropriate clocking signals) is used for each output signal 26a . . . 26n. By having many of these ALU summing circuits in parallel, the time required to determine an output signal 26a . . . 26n is proportially shortened. The time needed is only that to sequentially add the binary number contained in each row of registers (say, register 234a . . . 234n) to the temporary total stored in, say, the register 225a: one ALU "add" cycle for each of the registers in the row. In self-organizing circuits wherein the time required to determine an output is not critical, the ALU summing circuit can be multiplexed: an ALU circuit may accept binary number information from several rows of registers. As each ALU circuit is multiplexed to handle more rows of registers, the speed of output determination is necessarily reduced, but the number of ALUs (a relatively expensive circuit) required is also reduced. In addition, a strict "pool" of registers can be utilized whereby any register can take the place of any other; in circuit 230, a register in one row (say, register 234a) could not replace that of another row (say, register 237a).

Ultimately, only one ALU summing circuit is required, as shown in the circuit designated 250 in FIG.

Figure 17:
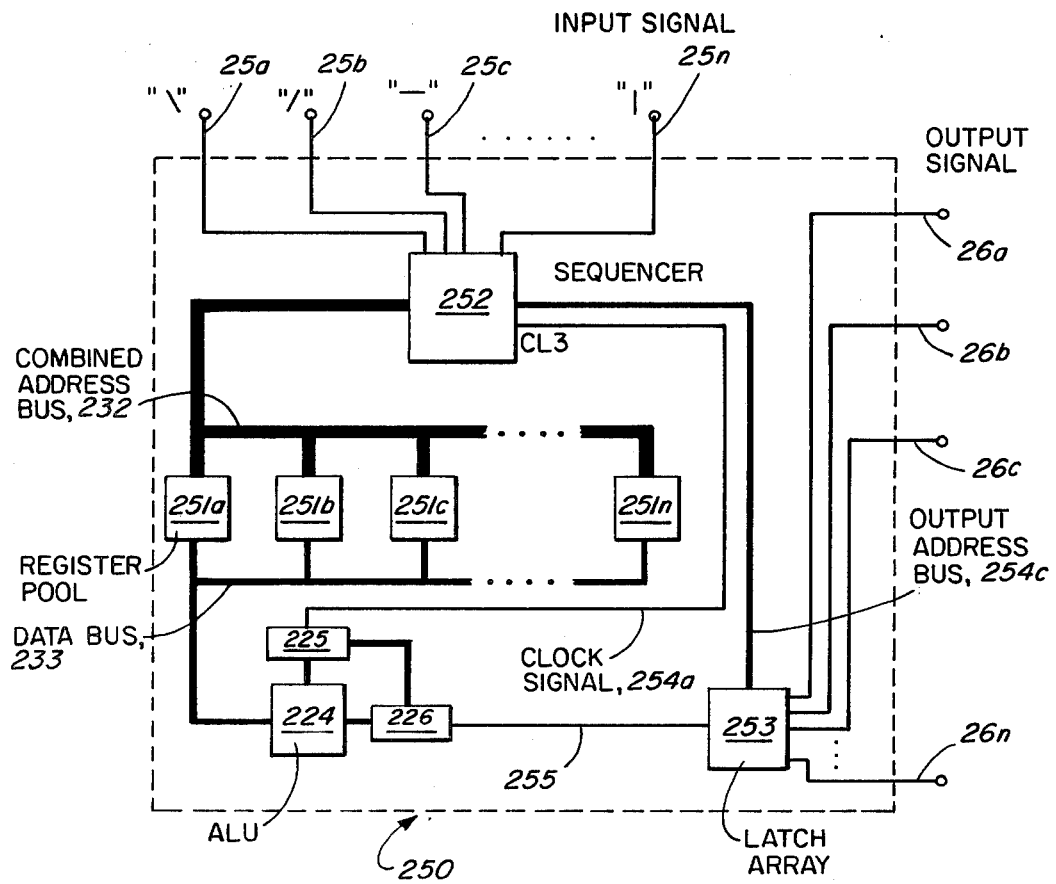
FIG. 17 shows diagrammatically a modification of the circuit in FIG. 15.

17. As in other self-organizing circuits, the input signals to the circuit 250 are again labeled 25a ... 25n and the output signals are labeled 26a ... 26n. Also, reward-/punish connections and clocking connections are not shown for clarity; they operate in a manner similar to that described previously for other hybrid or digital self-organizing circuits. When any signal at input connections 25a ... 25n in FIG. 17 are recognized by a coder/sequencer 252, it begins its operation: it will cycle through each of the input signals 25a ... 25n present for each of the output signals 26a ... 26n. The sequencer 252 transmits on bus 232 the "combined address" of a register in the register pool 251a ... 251n. The combined address is composed of both the input signal address (representing the input signal 25a ... 25n) and the output signal address (representing the output signal 26a ... 26n).

During the learning mode, various registers 251a ... 251n in the pool are assigned to an input signal and an output signal by proper coding of the combined address code (such as signals labeled A ... N in FIG. 16) by the computer 9 in FIG. 1. Thus, each register 251a ... 251n is specified by an input-output address code. When the sequencer 252 outputs a particular combined address a register of the pool 251a ... 251n (whose address code matches the combined address) will output its contents onto a data bus 227 to be sent to ALU 224, to be summed with the contents of other registers associated with that particular output signal. A clock signal CL$_3$ (i.e., an active signal by sequencer 252 when all input signals present have been cycled for a particular output) clears the register 225 so that the ALU may begin a new binary number summation for the next output signal 26a ... 26n. When the sign bit of a register 226 is active, an output signal is sent via connection 255 to a latch array 252. The latch array 253 ensures that the output signal sent to connections 26a ... 26n in FIG. 17 remain as outputs during the entire cycle of the sequencer 252; the sequencer 252 sends the output address via an output address bus 254c to the latch array 253. Thus, the proper output result at the connection 255 is latched to the proper output of the set 26a ... 26n.

In operation, the signals 25a ... 25n in FIG. 17 are applied as active input signals to the sequencer 252. For exammple, if the sensors 10 in FIG. 1 are presented a pattern 11 representing the letter "A", the active inputs to the circuits 250 may represent components of the latter "A". Active signals on connections 25a, 25b and 25c may represent a left diagonal, a right diagonal and a horizontal respectively; for simplicity let it be assumed that only these three active signals are required to recognize the letter "a" pattern presented to the sensors 10. The three input signals 25a ... 25c represent the set of signals among the entire set of signals 25a ... 25n which are active during this particular cycle of operation of the circuit 250. The sequencer 252 will initially send out to the address bus 232 the combined address of the active input signal 25a and the address of the output signal 26a. Let it be further assumed that the computer 9 had previously assigned the register 251a with this address code. A compare circuit such as circuit 240 (FIG. 16) decodes the address and causes the contents of the register 251a to be applied as output to the data bus 233.

The sequencer 252 will also send a "clear" signal (labeled CL$_3$ in FIG. 17) via connection 254a to the register 225 at the beginning of the cycle. Prior to a summation by the ALU 224, in this example, then, the contents of the register 251a are added into the cleared register 225 (i.e., zero binary number) to give a sub-total first into the register 226 and then into the register 225. Next the sequencer 252 sends the address of the active input signal 25b in FIG. 17 and output signal 26a to the register pool 251a ... 251n; assuming that register 251b has been assigned this combined code, its contents will be transmitted to the ALU 224 to be summed with the subtotal contained in register 225 into the register 226 in the manner described previously. Lastly, the address of the active input 25c and the active output 26a in FIG. 17 are transmitted to the register pool; if the register 251c has been assigned this combined address code, its contents will in turn be summed by the ALU 224 into the subtotal held in the registers 225 and 226. If the sign bit of the register 226 is positive, an active signal is transmitted over the connection 255 to the latch array 253.

The sequencer 252 has also transmitted to the latch 253 the output address—in this case the address for the output signal 26a. The latch array 253, given an active signal from the connection 255 and the output address for the signal 26a, will apply an active output signal onto the connection 26a and latch it there, i.e., continue to transmit the signal 26a during further operation of the circuit 250.

Having completed the summation operation of the first output signal 26a, the sequencer 252 begins a summation operation for the second signal 26b. First a clock signal is sent to the register 225, clearing its contents to start a new summation cycle by the ALU 224. Next addresses for, in turn, active input signals 25a, 25b and 25c (each combined with the output address for signal 26b) are transmitted to the register pool via the address bus 232. Registers other than 251a, 251b and 251c will have been previously assigned these address codes and will sequentially respond by transmitting their contents to the ALU 224 for summation. If the sum is positive, the signal 26b in FIG. 17 will be latched by an active signal sent from the ALU register 226 via connection 255 and by output address signals sent from the sequencer 252 via connection 254c.

Each output connection 26a ... 26n (FIG. 17), in turn, generates its own summation cycle. The cycle includes clearing the register 225 and then adding the contents of each input signal register 25a ... 25n which has been assigned to that output signal connection. Thus, only one ALU summing circuit is required to do summations of register contents.

In a more complicated circuit 250, the input signals 25a ... 25n need not be individual wires each representing an input component or feature. Instead the active input signals 25a ... 25n may be represented by a binary code of a particular input component or feature. This binary code forms part of the combined address. Similarly, the output pattern identifications 26a ... 26n may be a binary representation of the actual signals. The sequencer 252 sends the address of the output signal to connections 26a ... 26n whenever connection 255 is activated. This form of circuit 250 necessarily operates in serial manner: each active input signal 25a ... 25n address is transmitted to the circuit 250, one after the other, and each output signal 26a ... 26n address is sequentially transmitted from the circuit 250. The serial operation functions quite well, though slowly, and can be used when time is not critical. However, it has another important advantage. The digital encoding of the features allows relatively few connections 25a ... 25n and 26a ... 26n to connect as input/output ports between the circuits 21A ... 21N in FIG. 2. Instead of requiring, say, one hundred input and output connections for a typical hybrid circuit 21, a circuit 250 whose input and output signals were digitally encoded requires only six connections for the same number of input components 25a ... 25n and output identifications 26a ... 26n.

Earlier, in relation to FIGS. 8,9,10,11,18 and 19, preprocessor circuits were discussed for the self-organizing circuits such as circuit 21 in FIG. 7. Preprocessor circuits for a serially sequencing digital circuit such as circuit 250 described above, may take a somewhat different form. For example, an array of pixels in such a preprocessor circuit may have signals (such as signal 121 in FIG. 8) digitally coded to transmit the address of the pixel 123 which was activated. Sequencing circuits operate on these address signals such that the array of pixels 123 is scanned: each pixel in turn is processed by the preprocessing circuits such as circuits 125a ... 125d. AND and OR combinations of the neighboring pixels may be performed serially similar to the manner in which circuits like circuit 250 perform serial summations of input signals 25a ... 25n, except AND or OR operations are performed instead of summation operations. Thus, the entire functioning of self-organizing circuit 1 in FIG. 1 including the preprocessor circuits may be accomplished in serial manner rather than the parallel manner.

In some situations, where time-varying information (such as audio information from an acoustic source) is at too high a frequency for recognition by the self-organizing circuit it may be digitally decomposed into its constitutent frequencies using standard time-to-frequency conversion techniques such as fast Fourier transforms. In this case, analog filters such as filter 270a ... 270n in FIG. 18 are not required; only an analog-to-digital (A/D converter) and the appropriate digital filters are required. The output of the digital filters may be transmitted in parallel or serially to the self-organizing circuit 1 in order to recognize patterns in the time-varying signal.

Between a completely serial circuit 250 and a completely parallel circuit, lie many intermediate variations. Serial circuits, whose operations must be done one after the other, are necessarily slower than parallel circuits whose operations need not be done sequentially. However, serial circuits have other advantages, such as the digital encoding of addresses to reduce I/O ports (as was discussed above). Other circuits, such as the circuit 230, have elements of both serial and parallel circuits. In circuit 230, each output connection 26a ... 26n has a signal which functions in parallel with other output connection signals; although each input signal 25a ... 25n is serially processed by the coder 231 to give the proper summation at the ALUs 224a ... 224n. The invention disclosed here is meant to incorporate other such variations between purely serial circuits like circuit 250 and purely parallel circuits like circuit 21.

The foregoing explanation emphasizes use of the present inventive concepts in the field of pattern recognition. It will be appreciated, however, that the sensors 10 can be part of a thing to be controlled which can further include a microprocessor, associated RAMs, ROMs and PROMs; indeed, the self-organizing circuit 1 of FIG. 1 could also be so included. The sensors 10 might, in this circumstance, be a television camera (see the Birk et al U.S. Pat. No. 4,146,924). The teaching process discussed above would then be applied, as before, through the computer 9—but with a sizable input from a human operator working through the computer.

These and still further modifications of the present invention will occur to persons skilled in the art and all such modifications are deemed to be within the scope of the invention as defined by the appended claims.

What is claimed is:

1. A system that comprises:
transducer means to sense an input thereto and operable to provide a first output signal representative of said input;
self-organizing circuit means connected to receive said first output signal and operable to effect analysis of constituent elements of said input and provide a further output signal related to said input, each self-organizing circuit of said self-organizing circuit means including a plurality of sub-circuits or levels which are connected to receive messages from some other sub-circuit or level and are operable to deliver messages to some other sub-circuit or level, there being voting in that each sub-circuit or level weights relative amounts of negative and positive inputs thereto and votes whether or not to pass along information to the further sub-circuits or levels; and
means connected to apply modifying inputs to each sub-circuit or level of the self-organizing circuit means, which modifying innputs serve to correct errors in the further output signal occasioned by inaccurate analysis of the input by the self-organizing circuit means.

2. A system as claimed in claim 1 in which the transducer means is a sensor operable to accept light containing information as an electrical analog signal and adapted to convert that analog signal to a binary digital signal.

3. A system as claimed in claim 1 in which each sub-circuit or level provides path reinforcement to the other sub-circuits or levels.

4. A system as claimed in claim 3 in which the self-organizing circuit further includes a preprocessor circuit connected to receive said first output signal as input thereto, which preprocessor is adapted to process said input to provide better prior organization of said first output signal to improve or simplify the analysis of constituent elements thereof, the thus-organized signal being connected as input to said plurality of sub-circuits or levels, the connection being such that the inputs to the successive sub-circuits or levels are serial in that a signal to a particular sub-circuit or level is modified by that particular sub-circuit or level and then passed along to successive sub-circuits or levels, or the signal is passed along to successive sub-circuits or levels without modifications.

5. A system that comprises:
transducer means to sense as input thereto a signal containing information, said transducer means being operable to convert that input to a first output signal representative of said input;
self-organizing circuit means connected to receive said first output signal and operable to effect analysis of the pattern of constituent elements thereof and provide a second output signal shaped, at least in part, by said information, said self-organizing circuit means comprising multi-levels with punish and reward signals to all levels, feedback signals at all levels and random initial output weighting; and means connected to apply modifying inputs to the self-organizing circuit means at all levels, which modifying inputs serve to correct errors in the second output signal pattern occasioned by inaccurate analysis by the self-organizing circuit means, which modifying inputs include said punish and reward signals.

6. A system that comprises:
self-organizing circuit means connected to receive as input information in the form of a signal and operable to effect analysis of the pattern of constituent elements thereof to extract said information from the input signal and provide an output signal related to said information, said self-organizing circuit means comprising multi-level circuits wherein, the information flows from a lower-level circuit to a higher-level circuit; and
means connected to apply modifying inputs to the self-organizing circuit means, which modifying inputs serve to correct errors in the output signal pattern occasioned by inaccurate analysis of the self-organizing circuit means, which modifying inputs include punish and reward signals.

7. A system as claimed in claim 6 in which said signal is an electrical signal.

8. A system that comprises:
self-organizing circuit means connected to receive a plurality of input signals representing constituent elements of input information and operable to effect identification of the pattern of constituent elements by combining the influence which each constituent element has on the pattern of constituent elements, said self-organizing circuit means comprising multi-levels with feedback from higher levels to lower levels to aid in identification of said pattern, said self-organizing circuit means being operable to provide an output signal related to said pattern; and
correction means connected to modify said self-organizing circuit means by varying the influence which each constituent element has on the pattern of constituent elements as occasioned by accurate and inaccurate identification of said input information.

9. A system as in claim 8 in which said self-organizing circuit means comprises:
primarily analog means for combining the influence which each constituent element has on the pattern of constituent elements.

10. A system as in claim 8 in which said self-organizing circuit means effects identification among a plurality of possible patterns of constituent elements of input information and provides a plurality of output signals based on said identification.

11. A system as in claim 8 in which said self-organizing circuit means uses primarily digital means for combining the influence which each constituent element has on the pattern of constituent elements.

12. A system as in claim 8 in which self-organizing circuit means receives time-varying input information and whose identification of the pattern of constituent elements of said input information also varies with time.

13. A system as in claim 8 in which said self-organizing circuit means effects said identification of said pattern by simultaneously combining the influence of constituent elements of said input information.

14. A system as in claim 8 in which said self-organizing circuit means effects said identification of said pattern by sequentially combining the influence of constituent elements of said input information.

15. A system as in claim 8 in which said corrective means by which the influence of each constitutive element has on the pattern of constituent elements is varied by non-electrical means including but not limited to pneumatic, hydraulic, chemical, optical, magnetic or electrostatic means.

16. A system as in claim 8 in which the input information is non-electrical and is transduced to electrical input information by electronic transducer means.

17. A system as in claim 8 in which a plurality of said self-organizing means are organized such that the output of one self-organizing circuit becomes part of the input information for another self-organizing circuit and said correction means varies the influence which each constituent element has on the pattern of constituent elements of each said self-organizing circuit based on the accurate and inaccurate identification of input information of any of the plurality of self-organizing circuits.

18. A system as in claim 8 in which is incorporated into a device which uses said identification of the pattern of constituent elements of input informaton to alter the input information received by the device.

19. A system as in claim 8 in which the initial influence which each constituent element has on the pattern of constituent elements is randomly chosen.

20. A system as in claim 8 in which the self-organizing circuit further includes a preprocessor circuit connected to receive said plurality of input signals as input thereto, which preprocessor is adapted to process said input signals to provide constituent elements of said input information which improve or simplify the identification of said input information.

21. A system according to claim 1 in which each self-organizing circuit of the self-organizing circuit means is an analog circuit and in which voting is implemented by a multiple-input voting circuit that receives input electrical currents and produces an output that is proportional to the sum of the input currents, the output of the analog circuit being a function of said sum.

22. A system according to claim 21 in which each self-organizing circuit includes means to effect path reinforcement.

23. A system according to claim 1 in which each sub-circuit or level comprises a plurality of DACs and associated voting circuits combined to form a sub-circuit or level, said DACs including path-related DACs which add electric current to the voting circuit associated therewith and threshold DACs which draw current from the associated voting circuit, the outputs of the plurality of voting circuits being the output of the sub-circuit or level and being combined with like outputs from other sub-circuits or levels to form said further output signal.

24. A system according to claim 23 in which the means connected to apply modifying inputs to the self-organizing circuit means is a computer connected to receive said further output signal and programmed to interact with the self-organizing circuit means in a learning mode, said computer being operable to provide learning signals, recognize signals, punish signals and reward signals appropriately applied as input to the self-organizing circuit means, learning being in a heirarchical mode whereby lower level circuits learn primitive information and then higher levels are taught.

25. A system according to claim 24 that includes a preprocessor that is connected to receive said first output signal as input thereto, which preprocessor is adapted to process said input to provide better prior organization of said first output signal to improve or simplify the analysis of constituent elements thereof.

26. A system according to claim 23 in which the outputs of a particular level circuit are monitored by the computer, said outputs being representative of said first output signal and, ultimately, the input to the transducer means, any error in said further output signal being corrected by punishing the sub-circuit or level from which the error emanated and a desired output in said further output signal being rewarded.

27. A system according to claim 26 wherein each path-related DAC comprises a binary up-down counter, punishment being effected by reducing the value of the binary numbers in the counter and a reward being effected by increasing the value of the binary numbers in the counter, thereby respectively to decrease or increase electric current flow into the voting circuit associated with the particular DAC.

28. A system according to claim 27 wherein each threshold DAC comprises a binary up-down counter whose count is increased or decreased respectively to draw less or more electric current from the voting circuit associated therewith in the course of a learning experience.

29. A system according to claim 1 in which each sub-circuit or level comprises a plurality of positive-negative DACs, each positive-negative DAC being associated with a voting circuit and being adapted to apply and modify electric current to the associated voting circuit.

30. A system according to claim 29 in which each said DAC includes a binary up-down counter which applies positive current flow for positive values in the counter and negative flow for negative values in the counter, which system includes a computer to apply, during a learning mode, reward signals by adding binary bits to increase the value of the binary number stored in the counter and punishment signals by subtracting binary bits from the binary number stored in the counter.

31. A system according to claim 8 in which the correction means includes means to deliver punish and reward signals to the self-organizing circuit means.

32. A system according to claim 31 wherein the punish and reward signals are universal punish and reward signals, that is, signals that are delivered simultaneously to all levels of said multi-levels.

33. A system according to claim 8 that includes weighting means that includes a plurality of DACs, wherein initial weighting is achieved by randomly loading the DACs and that includes reward and punish circuit means to add to and subtract from the binary numbers in the DACs on the basis of said identification.

34. A system according to claim 5 wherein the self-organizing circuit means includes a plurality of DACs to permit weighting, weighting being achieved by introducing binary numbers to the DACs.

35. A system according to claim 34 wherein the DACs are positive/negative DACs in that each DAC comprises a positive/negative counter whose count is affected by said binary numbers.

36. A system according to claim 6 wherein feedback paths are provided to permit feedback signals to flow from the output of the higher-level circuit to the input to the lower-level circuit to enhance analysis of the pattern.

37. A system according to claim 36 wherein the multi-level circuits consist of several circuits that proceed from a lowest level circuit to an Nth or highest level circuit, wherein each level circuit includes a binary-weighted DAC which comprises a binary digital counter, wherein weighting of said output signal is achieved by controlling a binary-digital input to said counter.

38. A system according to claim 37 wherein initial weighting is achieved by means that loads the counter with small, but random, binary numbers, the punish and reward signals being applied by either adding or subtracting numbers from the counter to achieve learning.

39. A system according to claim 38 that includes an array of optical sensors to receive an optical pattern and operable to convert the optical pattern to an electrical signal representative of the optical pattern, a preprocessor circuit connected to receive the electrical signal and operable to convert the raw sensor data into useful information, that, in turn, is said information inputted to the self-organizing circuit means.

40. A system according to claim 39 wherein the sensor comprises pixels and associated electrical circuitry that obey the nearest neighbor rule in that if a pixel has an active output and one of its nearest neighbors also has an active output, then an active signal appears at a predetermined connection from the preprocessor.

41. A system according to claim 40 in which the associated circuitry includes AND-gate means and OR-gate means to permit identification of primitive components of the optical pattern and the general locations of the primitive components with respect to each other.

42. A system according to claim 1 wherein feedback means is provided to permit feedback signals to flow from the output of a higher sub-circuit or level to the input of a lower sub-circuit or level to enhance analysis of said first output signal.

43. A system according to claim 42 in which initial weights at each sub-circuit or level are randomly applied and in which said modifying inputs include punish and reward signals, said system including means to apply said punish and reward signals.

44. A system according to claim 8 that includes acoustic transducer means to receive sound waves and operable to convert the same to an electrical signal, a preprocessor connected to receive the electric signal and operable to process the same to provide said plurality of input signals to the self-organizing circuit means which serves to recognize a sound pattern in the sound waves, said self-organizing circuit means including a mechanism by which electric current to a summing junction is modified during a learning process adapted to permit recognition of the sound pattern.

* * * * *